US012598247B2

(12) United States Patent
Meen et al.

(10) Patent No.: US 12,598,247 B2
(45) Date of Patent: Apr. 7, 2026

(54) ELECTRONIC DEVICE AND METHOD FOR CONTROLLING A CONNECTABLE EXTERNAL DEVICE

(71) Applicant: Samsung Electronics Co., Ltd., Gyeonggi-do (KR)

(72) Inventors: Youngjae Meen, Gyeonggi-do (KR); Heeyul Kim, Gyeonggi-do (KR); Jaehyun Han, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 337 days.

(21) Appl. No.: 18/222,551

(22) Filed: Jul. 17, 2023

(65) Prior Publication Data

US 2023/0388404 A1 Nov. 30, 2023

Related U.S. Application Data

(63) Continuation of application No. PCT/KR2022/000822, filed on Jan. 17, 2022.

(30) Foreign Application Priority Data

Jan. 18, 2021 (KR) ........................ 10-2021-0006997

(51) Int. Cl.
H04M 1/72412 (2021.01)
H04M 1/02 (2006.01)
(Continued)

(52) U.S. Cl.
CPC ..... H04M 1/72412 (2021.01); H04M 1/0243 (2013.01); H04M 1/72427 (2021.01);
(Continued)

(58) Field of Classification Search
CPC ........... H04M 1/72412; H04M 1/0243; H04M 1/72427; H04M 1/72445; H04M 1/72469;
(Continued)

(56) References Cited

U.S. PATENT DOCUMENTS 9,648,099 B2 5/2017 Lee
9,886,100 B2 2/2018 Jung et al.
(Continued)

FOREIGN PATENT DOCUMENTS

EP 3 583 481 B1 5/2018
KR 10-2010-0075009 A 7/2010
(Continued)

OTHER PUBLICATIONS

Korean Office Action dated Jun. 27, 2025.

*Primary Examiner* — Farid Seyedvosoghi
(74) *Attorney, Agent, or Firm* — CANTOR COLBURN LLP

(57) ABSTRACT

An electronic device according to various embodiments of the present disclosure comprises a housing, a display, a memory storing an application, a communication module, and at least one processor electrically connected to the display, the memory, and the communication module, the at least one processor receives, through the communication module from at least one external electronic device, connection information including device identification information and target function information, controls, in response to reception of the connection information, the display to display a first user interface for receiving a first user input for connection approval, determines, in response to the first user input, a control means on the basis of the target function information, adds the at least one external electronic device to a connection candidate device list, controls the display to display the connection candidate device list indicating the at least one external electronic device, and executes the determined control means and controls the display to display a second user interface in response to a second user input of selecting the indicator from the connection candidate device list.

17 Claims, 32 Drawing Sheets

(51) Int. Cl.
 H04M 1/72427 (2021.01)
 H04M 1/72445 (2021.01)
 H04W 76/11 (2018.01)

(52) U.S. Cl.
 CPC ....... H04M 1/72445 (2021.01); H04W 76/11
  (2018.02); H04M 2201/38 (2013.01)

(58) Field of Classification Search
 CPC ......... H04M 1/72409; H04M 1/72415; H04M
  1/0216; H04M 2201/38; H04M 2250/22;
  H04W 76/11; G06F 3/0482; G06F 3/0488
 See application file for complete search history.

(56) References Cited

U.S. PATENT DOCUMENTS

| | | | | |
|---|---|---|---|---|
| 2014/0129695 | A1* | 5/2014 | Yerli | G06F 9/54 |
| | | | | 709/224 |
| 2015/0264428 | A1 | 9/2015 | Kim et al. | |

| | | | | |
|---|---|---|---|---|
| 2017/0280185 | A1 | 9/2017 | Lee | |
| 2018/0301121 | A1 | 10/2018 | Kim et al. | |
| 2019/0207933 | A1 | 7/2019 | Kim | |
| 2019/0303066 | A1* | 10/2019 | Kai | G06F 3/1204 |
| 2020/0177714 | A1 | 6/2020 | Jung et al. | |
| 2021/0342431 | A1 | 11/2021 | Kim et al. | |

FOREIGN PATENT DOCUMENTS

| | | | | | |
|---|---|---|---|---|---|
| KR | 10-2013-0137923 | A | | 12/2013 | |
| KR | 10-2014-0057177 | A | | 5/2014 | |
| KR | 10-2014-0124579 | A | | 10/2014 | |
| KR | 10-2016-0097392 | A | | 8/2016 | |
| KR | 20160097392 | A | * | 8/2016 | G06F 9/453 |
| KR | 10-2018-0063026 | A | | 6/2018 | |
| KR | 20180063026 | A | * | 6/2018 | H04N 21/42209 |
| KR | 10-2019-0010702 | A | | 1/2019 | |
| KR | 20190010702 | A | * | 1/2019 | G06F 21/32 |
| KR | 10-2020-0023595 | A | | 3/2020 | |

* cited by examiner

ELECTRONIC DEVICE AND METHOD FOR CONTROLLING A CONNECTABLE EXTERNAL DEVICE

CLAIM OF PRIORITY

This application is a continuation of International Application No. PCT/KR2022/000822, which was filed on Jan. 17, 2022, and claims priority to Korean Patent Application No. 10-2021-0006997, filed in the Korean Intellectual Property Office on Jan. 18, 2021, the disclosure of which is incorporated herein by reference in its entirety.

TECHNICAL FIELD

The disclosure relates to an electronic device and a method for controlling a connectable external device.

RELATED ART

Recently, electronic devices including a foldable display have been developed. Such electronic devices including a foldable display may be carried in a folded state, to provide improved portability. In addition, electronic devices including a foldable display may offer a screen having a large size in an unfolded state.

As various types of electronic devices are introduced, the operating systems (OSs) for operating these electronic devices are continuously multiplying. For example, a list of these operating systems includes Tizen™ from Samsung Electronics™ and Intel™, Linux's UBUNTU™, FireFox OS™ from Mozilla™, Windows Mobile™ from Microsoft™, and the like, as well as Android™ from Google™ or iOS™ from Apple™.

SUMMARY

Electronic devices generally operate using one operating system. Users of such devices may have limitations in freely controlling functions of applications executing on external electronic devices having different operating systems using the electronic device.

In addition, there is a need to provide a user experience that allows device users to intuitively and easily control electronic devices using various types of display devices (e.g., foldable or slidable display devices).

The technical solutions described in this document are not limited to the above-mentioned, and other not mentioned problems, these solutions will be clearly understood by those skilled in the art from the description below.

According to certain embodiments of the disclosure, an electronic device may include a housing, a display, at least one memory configured to store applications, a communication module, and at least one processor electrically connected to the display, the memory, and the communication module, the at least one processor may be configured to receive connection information including device identification information and target function information from at least one external electronic device through the communication module, control, in response to the reception of the connection information, the display to display a first user interface for receiving a first user input for connection approval, determine a control means, based on the target function information, in response to the first user input, add the at least one external electronic device to a connection candidate device list, control the display to display the connection candidate device list including an indicator indicating the at least one external electronic device, and control the display to display a second user interface by executing the determined control means in response to a second user input for selecting the indicator from the connection candidate device list.

According to certain embodiments of the disclosure, an operation method of an electronic device may include receiving connection information including device identification information and target function information from at least one external electronic device through a communication module, controlling, in response to reception of the connection information, a display to display a first user interface for receiving a first user input for connection approval, determining a control means, based on the target function information, in response to the first user input, and adding the at least one external electronic device to a connection candidate device list, controlling the display to display the connection candidate device list including an indicator indicating the at least one external electronic device, and controlling the display to display a second user interface by executing the determined control means in response to a second user input for selecting the indicator from the connection candidate device list.

According to certain embodiments disclosed in this document, an electronic device may freely control functions executed in various external electronic devices having different operating systems from the electronic device, thereby increasing the utilization of functions executed in the external electronic device.

According to an embodiment, the electronic device may provide an improved user experience by providing various user interfaces for controlling functions of an external electronic device through a display and/or an auxiliary display.

Effects obtainable in the disclosure are not limited to the effects mentioned above, and other effects that are not mentioned above may be clearly understood by those skilled in the art to which the disclosure pertains from the description below.

DETAILED DESCRIPTION

Hereinafter, certain embodiments of the disclosure will be described with reference to the accompanying drawings. However, it should be understood that this is not intended to limit the specific embodiments of the disclosure and includes various modifications, equivalents, and/or alternatives of the embodiments of the disclosure.

Figure 1:
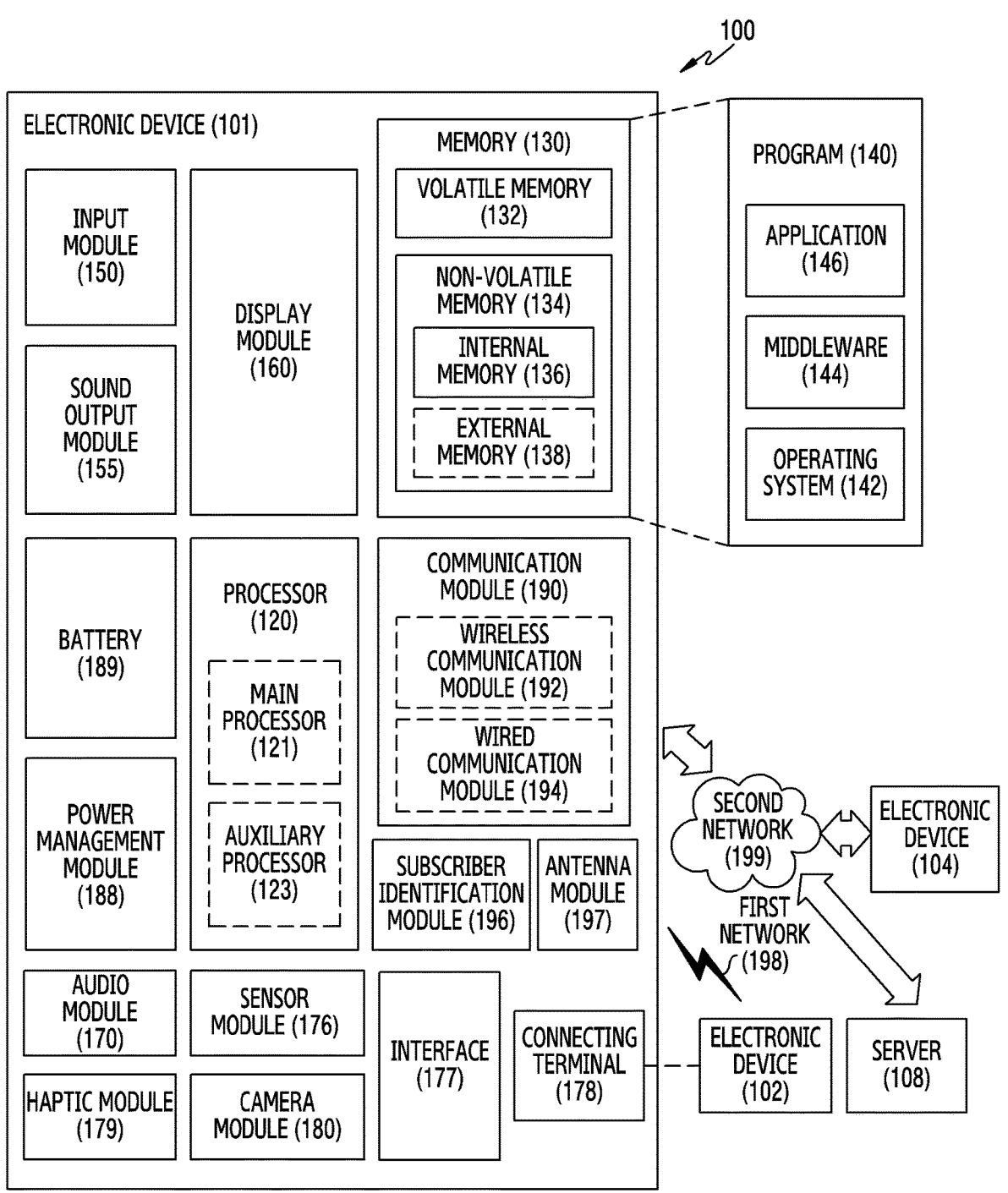
FIG. 1 is a block diagram of an electronic device in a network environment according to certain embodiments.

FIG. 1 is a block diagram of an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 in FIG. 1 described below may be an electronic device including various displays. For example, the electronic device 101 may be a smartphone, a tablet PC, a portable multimedia player (PMP), a note-book PC, a smart TV, or the like. However, the electronic device 101 will be described as an electronic device including a foldable display for convenience of explanation, but the electronic device is not limited by the description.

Figure 2:
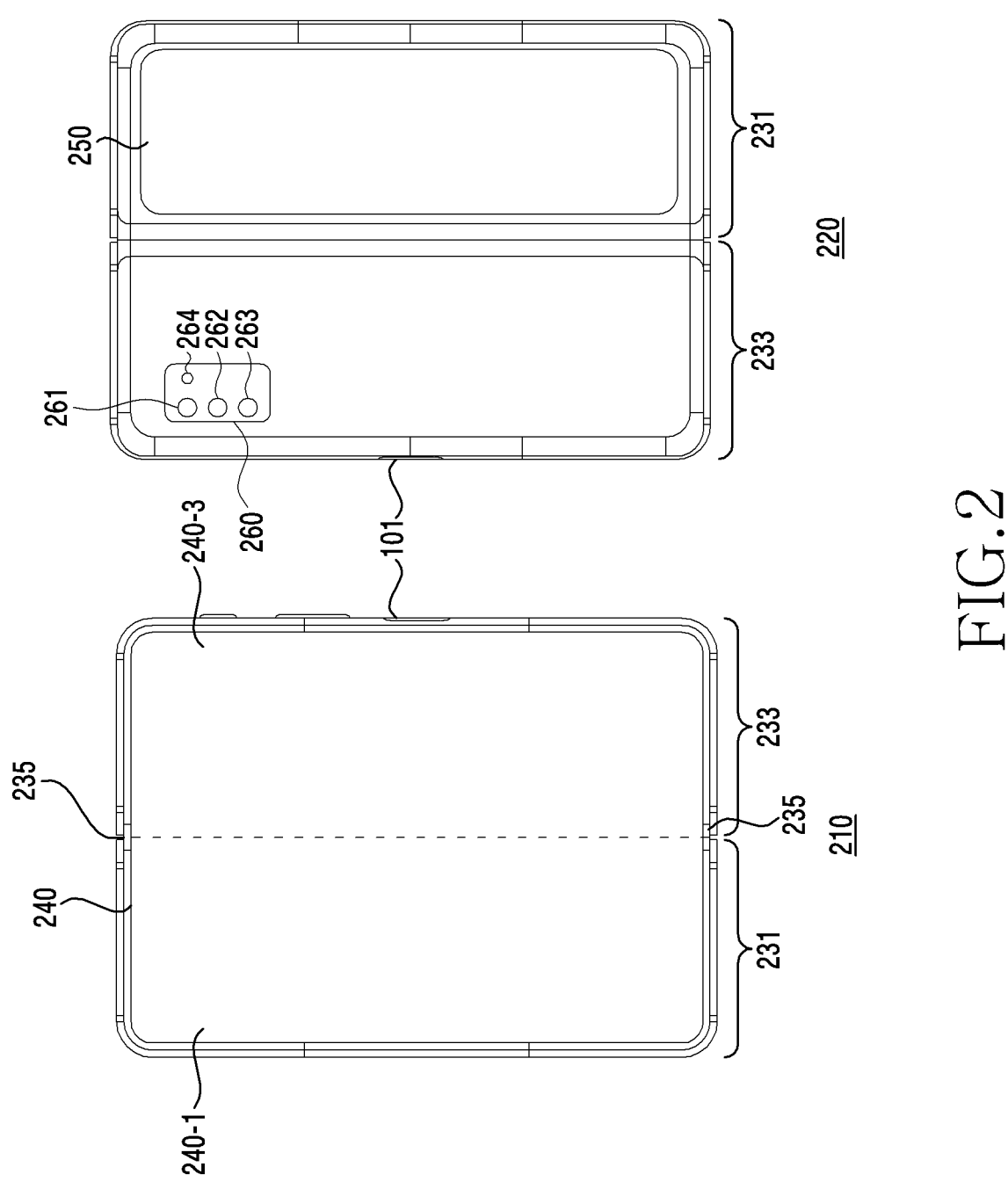
FIG. 2 is a diagram illustrating an electronic device according to an embodiment.

FIG. 2 is a diagram illustrating an electronic device 101 according to an embodiment.

FIG. 2 is a diagram illustrating a front surface and a rear surface of the electronic device 101 in an unfolded state. According to an embodiment, a drawing 210 may show a front side of the electronic device 101 in an unfolded state, and a drawing 220 may represent a rear surface of the electronic device 101 in an unfolded state.

In an embodiment, the electronic device 101 may include a first housing 231, a second housing 233, a hinge part 235, a display 240, a secondary display 250, and a camera module 260.

In an embodiment, the first housing 231 and the second housing 233 may be connected. One side surface of the first housing 231 and one side surface of the second housing 233 may be connected. In an example, the first housing 231 and the second housing 233 may be connected by a hinge part 235. In an embodiment, the first housing 231 and the second housing 233 may be connected to be rotatable about the hinge part 235.

In an embodiment, the display 240 may be exposed to the outside through a first area of the first housing 231 and a second area of the second housing 233. In an example, the display 240 may be disposed on the first housing 231 and the second housing 233 across the hinge part 235.

In an embodiment, the display 240 may be a foldable display. In an embodiment, the display 240 may be folded or unfolded as the first housing 231 and the second housing 233 rotate around the hinge part 235. Although examples in which the display 240 is folded or unfolded will be described below, the disclosure is not limited thereto. For example, the display 240 may be implemented in a curved (or bent) form, and the examples in which the display 240 is implemented in a curved form may be described in the same or a similar manner to the case in which the display 240 is folded or unfolded.

In an embodiment, when the first housing 231 and the second housing 233 are folded around the hinge part 235 to have a certain angle, a first portion (hereinafter referred to as a "1-1st display") of the display 240 and a second portion (hereinafter referred to as a "1-2nd display") of the display 240 may also be folded around the hinge part 235 to have a certain angle. For example, in the drawing 210, the 1-1st display 240-1 may be a left portion of the display 240 based on an axis of the hinge part 235 (e.g., a dotted line in the drawing 210), and the 1-2nd display 240-3 may be a right portion of the display 240 based on the axis of the hinge part 235. Hereinafter, the first housing 231 and the second housing 233 (or the 1-1st display 240-1 and the 1-2nd display 240-3) may form an angle based on the hinge part 235, which will be referred to as a "folding angle". The folding angle may be an angle formed between the first housing 231 and the second housing 233. For example, the electronic device 101 may be in the state where the folding angle is about 0 degrees (S). In an embodiment, when the electronic device 101 is in a fully folded state, the display 240 may be in an inactive state (e.g., a standby state or a power saving state) in which content is not displayed. In an example, when the electronic device 101 is in a fully folded state, the secondary display 250 may be in the state of displaying specified content (e.g., time) in a power saving state or in an inactive state.

In an embodiment, the secondary display 250 may be exposed to the outside through a third area of the first housing 231. In an example, the secondary display 250 may be disposed on a third area of the first housing 231 facing in a direction opposite that of the first area of the first housing 231. The secondary display 250 may be disposed on one surface of the first housing 231 on which the 1-1st display 240-1 is disposed. In an example, the secondary display 250 may be a non-foldable display.

In an embodiment, the camera module 260 may include camera devices 261, 262, and 263 and/or a flash 264. The camera module 260 may include one or more lenses, an image sensor, and/or an image signal processor. The flash 264 may include a light-emitting diode or a xenon lamp. In an example, the camera module 260 may be referred to as a camera module 260.

Figure 3:
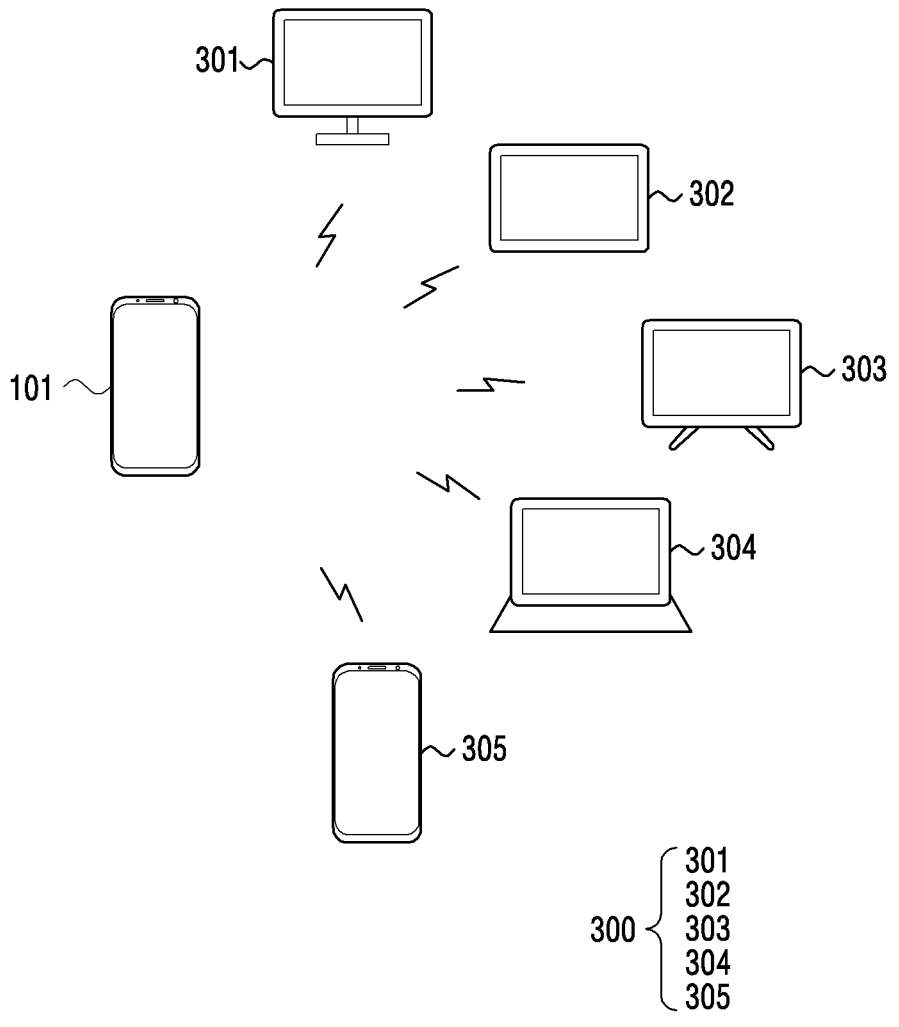
FIG. 3 is a diagram illustrating a system for controlling external electronic devices through an electronic device according to an embodiment.

FIG. 3 is a diagram illustrating a system for controlling external electronic devices 300 through an electronic device 101 according to an embodiment.

Referring to FIG. 3, a system according to an embodiment may include external electronic devices 300 and an electronic device 101. The electronic device 101 may be connected to at least one of the external electronic devices 300 through a network (e.g., the first network 198 and/or the second network 199 in FIG. 1).

In an embodiment, the electronic device 101 may transmit or receive data to or from the external electronic devices 300 through a network (e.g., the first network 198 and/or the second network 199 in FIG. 1).

In an embodiment, the external electronic devices 300 may include a plurality of devices. For example, the external electronic devices 300 may include at least one of a first device 301, a second device 302, a third device 303, a fourth device 304, or a fifth device 305. For example, the first device 301 may be a desktop. The second device 302 may be a tablet PC. The third device 303 may be a TV or a smart TV. The fourth device 304 may be a note-book PC. The fifth device 305 may be a mobile communication device such as a smartphone. In addition to the examples shown in FIG. 3, other appropriate devices may be connected to the electronic device 101. For example, wearable devices such as a smart watch and/or other gear may also be connected to the electronic device 101 and controlled through the electronic device 101 if they meet the communication function described in this document.

In an embodiment, the electronic device 101 and at least one external electronic device 300 may be connected through a wired connection based on a high-definition multimedia interface (HDML) or a universal serial bus (USB).

In an embodiment, the electronic device 101 and at least one external electronic device 300 may be connected to each other using a predetermined communication protocol. For example, the electronic device 101 may be connected to at least one external electronic device 300 through a short-range network. For example, a network (e.g., a short-range network) for establishing a connection between the electronic device 101 and at least one external electronic device 300 may be appropriately selected. For example, at least one of Bluetooth low-energy (BLE), Wi-Fi direct, near-field communication (NFC), ultra-wide band (UWB) communication, or infrared communication may be used together with or instead of Bluetooth in order to establish a connection with at least one external electronic devices 300. In addition, at least one external electronic device 300 may establish a connection using a mesh network (e.g., Zigbee or Z-Wave) as short-range wireless communication.

In an embodiment, there may be various methods of connecting the electronic device 101 and at least one external electronic device 300 depending on device information (e.g., device elements). For example, in the case where at least one external electronic device 300 is an IP-based (IP address) device, a connection with a network (e.g., the second network 199 in FIG. 1) may be established using a service set identifier (SSID), and if it is not an IP-based device (e.g., BLE, Zigbee, or Z-Wave), a connection of the electronic device 101 and a network (e.g., the second network 199 in FIG. 1) may be established using a hub device (not shown).

In certain embodiments, the description of the electronic device 101 may be appropriately applied to at least one external electronic device 300.

Figure 4:
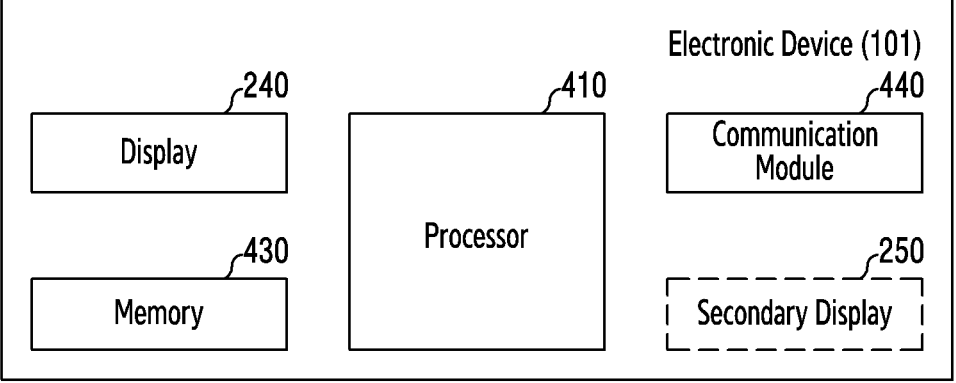
FIG. 4 is a block diagram illustrating elements of an electronic device according to an embodiment.

FIG. 4 is a block diagram illustrating elements of an electronic device 101 according to an embodiment.

Referring to FIG. 4, the electronic device 101 may include a display 240, a memory 430, a communication module 440, and at least one processor 410 electrically connected thereto. In an example, elements of the electronic device 101 shown in FIG. 4 may be replaced with other elements, or additional elements may be included in the electronic device 101. For example, the electronic device 101 may further include a secondary display 250.

In an embodiment, the processor 410 of the electronic device 101 may correspond to the processor 120 in FIG. 1. The processor 410 may execute one or more instructions stored in the memory 430 to control the operation of elements (e.g., the display 240) of the electronic device 101. The processor 410 may execute instructions included in software to control at least one other element connected to the processor 410. The processor 410 may obtain instructions and interpret the obtained instructions to process data or perform calculations. It may be understood that the operation of the electronic device 101 mentioned in this document is performed by the processor 410 by executing instructions.

In an embodiment, the electronic device 101 may include a display 240 and a secondary display 250.

In an embodiment, the display 240 may visually display (may be referred to as present or output) images. For example, the processor 410 of the electronic device 101 may display, through the display 240, a screen of reproducing video files stored in the memory 430 or video streams received from the outside. In certain embodiments, the memory 430 may temporarily or non-temporarily store a variety of data used by elements of the electronic device 101.

In an embodiment, the display 240 visually outputs information to a user through a display 240 based on at least one of organic light-emitting diodes (OLEDs), liquid crystal displays (LCDs), and light-emitting diodes (LEDs). In order to more intuitively control a user interface (UI) output through the display 240, the electronic device 101 may include a touch screen panel (TSP) disposed on the display 240. The touch screen panel may detect the position of an object (e.g., a user's finger or a stylus pen) that touches the display 240 or hovers above the display 240 using at least one of a resistive film, capacitive elements, surface acoustic waves, and infrared rays. In an example, features applied to the display 240 may be equally applied to the secondary display 250.

In an embodiment, the processor 410 may generally control operations for providing various user interfaces through the display 240, based on an operation mode specified depending on a folding angle of the electronic device 101. The operation of the processor 410 to provide a user interface corresponding to a folding angle will be described later with reference to FIGS. 15 and 18.

In an embodiment, the memory 430 may store commands or data related to at least one element of the electronic device 101. For example, the memory 430 may store information about application programs, other modules, and program data related to an operating system.

In an embodiment, the memory 430 may include volatile memory, such as random access memory (RAM) including static random access memory (SRAM) or dynamic random access memory (DRAM), or non-volatile memory such as flash memory, embedded multi-media card (eMMC), a solid state drive (SSD), or the like, as well as read-only memory (ROM), magneto-resistive RAM (MRAM), spin-transfer torque MRAM (STT-MRAM), phase-change RAM (PRAM), resistive RAM (RRAM), and ferroelectric RAM (FeRAM).

In an embodiment, the communication module 440 may support establishment of a wired or wireless communication channel with the external electronic device 300 and communication through the established communication channel. The communication module 440 may include a wireless communication module (e.g., a cellular communication module, a short-range wireless communication module, or a global navigation satellite system (GNSS) communication module) and/or a wired communication module (e.g., a local area network (LAN) communication module or a USB communication module).

In an embodiment, the communication module 440 may communicate with the external electronic device 300 through a network (e.g., the first network 198 and/or the second network 199 in FIG. 1) using the wired communication module and/or the wireless communication module.

In an embodiment, the electronic device 101 may control and/or share data with external electronic device 300 that is logging on to a service provided through the electronic device 101 using the same account information as user account information used to log on the service and/or external electronic device 300 that is logging on to the same using account information linked to the user account information, among external electronic devices 300 connectable through the communication module 440. In an embodiment, the electronic device 101 may not control and/or share data with an external electronic device 300 that has account information different from the user account information or is not logging on to the service using account information linked to the user account information.

In an embodiment, the communication module 440 may process data for data communication for control and configuration of the external electronic device 300 connected to the electronic device 101 into a form compatible with IOT (internet-of-things) communication protocols such as open connectivity foundation (OCF) or one machine-to-machine (M2M).

In an embodiment, the electronic device 101 may receive device identification information and target function information from the external electronic device 300 through the communication module 440. In an example, the electronic device 101 may transmit, to the external electronic device 300, information for controlling an application executing on the external electronic device 300 using the communication module 440.

Figure 5:
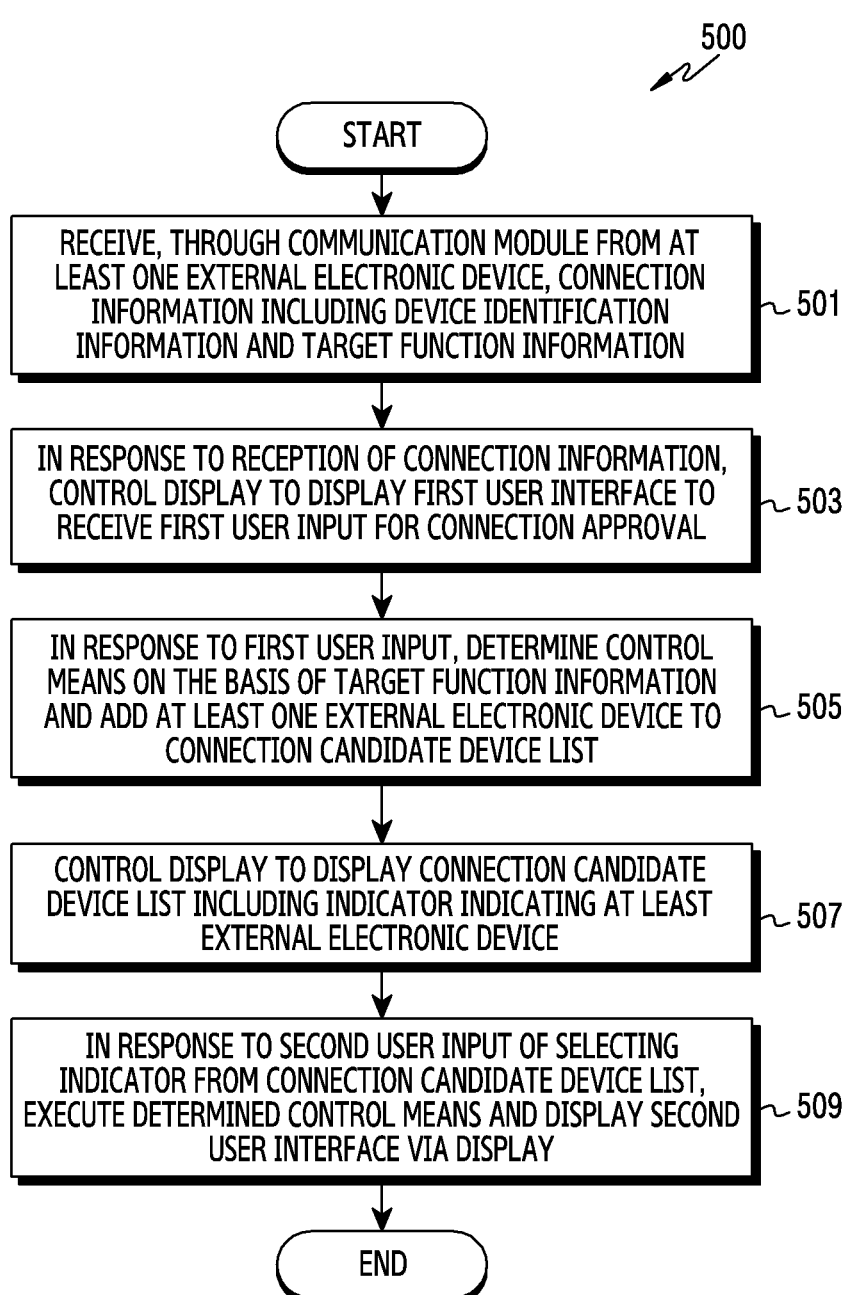
FIG. 5 is a flowchart illustrating operating processes of an electronic device for controlling external electronic devices according to an embodiment.

FIG. 5 is a flowchart 500 illustrating processes of an electronic device 101 for controlling external electronic devices 300 according to an embodiment. An operation entity of the flowchart 500 shown in FIG. 5 may be understood as the electronic device 101 or an element (e.g., the processor 410 in FIG. 4) of the electronic device 101.

According to an embodiment, in operation 501, the electronic device 101 (e.g., the processor 410 in FIG. 4) may receive connection information including device identification information and target function information from external electronic device 300 through the communication module 440. The connection information may denote information used for the electronic device 101 to connect with the external electronic device 300.

In an embodiment, the processor 410 may search for a control target device that is connectable with the electronic device 101. The processor 410 may transmit a search request message to external electronic device 300 using the communication module 440. The processor 410 may receive a response message to the search request message from external electronic device 300 using the communication module 440. The response message to the search request message may include connection information. The connection information may include device identification information and target function information of external electronic device 300.

In another embodiment, the processor 410 may receive a connection request message from external electronic device 300. In an example, external electronic device 300 may search for a device that is connectable with the external electronic device 300. External electronic device 300 may transmit a connection request message to the connectable electronic device 101. The connection request message may include connection information. The connection information may include device identification information and target function information of external electronic device 300.

In an embodiment, the connection information may include device identification information and target function information of external electronic device 300. In this document, the device identification information may denote information for identifying the external electronic device 300. For example, the device identification information may include a device name of the external electronic device 300, a model name of the external electronic device 300, a network address of the external electronic device 300, or an operating system (e.g., Android™, iOS™, Tizen™, or Windows™) identification information of the external electronic device 300. In this document, the target function information may denote information for identifying a function of the external electronic device 300 that is a target to be controlled through the electronic device 101. For example, the target function information may include application identification information for identifying an application (e.g., an image editing application, a presentation application, and/or a game application) executing on the external electronic device 300.

According to an embodiment, in operation 503, the electronic device 101 (e.g., the processor 410 in FIG. 4) may control the display 240 to display a first user interface for receiving a first user input indicating connection approval in response to receipt of the connection information.

In an embodiment, the electronic device 101 may output, through the display 240, a screen including a first user interface for receiving an input for a connection approval request with external electronic device 300. In an example, the electronic device 101 may output, to the display 240, a first user interface including an object related to whether the electronic device 101 is connected to external electronic device 300.

In an embodiment, the electronic device 101 may detect a first user input about whether the electronic device is connected to external electronic device 300. In an example, the electronic device 101 may select external electronic device 300 from among connectable electronic device by detecting the first user input to the first user interface displayed on the display 240. For example, selected electronic device 300 may be a first device 301 and a second device 302. As another example, the electronic device 101 may display a first user interface including a confirmation button together with at least some of the device identification information of the external electronic device 300 and receive a first user input indicating selecting the confirmation button.

According to an embodiment, in operation 505, the electronic device 101 (e.g., the processor 410 in FIG. 4) may determine a control means, based on the target function information, and add external electronic device 300 to the connection candidate device list in response to the first user input.

In an embodiment, the electronic device 101 may determine a control means, based on the device identification information and the target function information received from selected external electronic device 300 selected in response to the first user input in operation 503. For example, the operating system of the electronic device 101 may be Android™. Operating system identification information received from the first device 301 corresponding to external electronic device 300 selected by the first user input may include identification information corresponding to iOS™ and identification information of an application executing on the first device 301 may include image editing application identification information. In this case, the electronic device 101 may determine the control means, based on operating system identification information of the first device 301 and identification information of an image editing application executing on the first device 301, and a control application capable of controlling an image editing application corresponding to the Android™ operating system may be the control means.

In an embodiment, the electronic device 101 may determine the control means, based on the search result of the control application corresponding to the operating system of the electronic device 101. In an example, the electronic device 101 may identify whether the control application corresponding to the operating system of the electronic device 101 is installed in the memory 430 of the electronic device 101. For example, if the control application corresponding to the operating system and a target function of the electronic device 101 is not installed in the electronic device 101, the electronic device 101 may install the control application not installed. That is, the electronic device 101 may search for the control application corresponding to the operating system of the electronic device 101 through a server and download and install the searched control application. As a more specific example, if an image reproduction application is executed based on a first operating system in the external electronic device 300 and if the electronic device 101 operates based on a second operating system, the electronic device 101 may determine whether an image editing tool application, which is executed based on the second operating system, is installed. In an example, if the control application corresponding to the electronic device 101 is unable to be installed, the electronic device 101 may search for a web page address corresponding to identification information of the control application and access a web page corresponding to the searched web page address by executing a web browser. The web page may provide control functions for the operation of the external electronic device 300.

In an embodiment, the electronic device 101 may add external electronic device 300 with which a connection request has been approved by the first user input to the connection candidate device list. In an example, the connection candidate device list may indicate a list of external electronic device 300 that is controllable through the electronic device 101.

According to an embodiment, in operation 507, the electronic device 101 (e.g., the processor 410 in FIG. 4) may render on the display 240 the connection candidate device list including an indicator indicating external electronic device 300.

In an example, the electronic device 101 may display, on the display 240, the connection candidate device list to which external electronic device 300 is added according to operation 505. The connection candidate device list displayed through the display 240 may include an indicator indicating external electronic device 300 with which a connection request has been approved by the first user input according to operation 503. For example, if the electronic device 101 obtains connection request approval for the second device 302, the third device 303, and the fifth device 305 by an input including the first user input, indicators indicating the second device 302, the third device 303, and the fifth device 305 may be included in the connection candidate device list.

According to an embodiment, in operation 509, the electronic device 101 (e.g., the processor 410 in FIG. 4) may execute the determined control means and display a second user interface through the display 240 in response to a second user input for selecting an indicator from the connection candidate device list.

In an embodiment, the electronic device 101 may display, on the display 240, the connection candidate device list including the indicators indicating external electronic device 300 that is controllable through the electronic device 101 in order to select a control target electronic device.

In an embodiment, the electronic device 101 may detect a second user input to the indicators. In an example, the electronic device 101 may select an indicator indicating at least two or more external electronic devices 300. For example, an indicator indicating the second device 302 and the third device 303 may be selected by the second user input from the connection candidate device list including indicators indicating external electronic device 300.

In an embodiment, the electronic device 101 may execute the control means for controlling external electronic device 300 corresponding to the indicator selected by the second user input. In an example, the electronic device 101 may select two or more indicators by the second user input. In an example, the electronic device 101 may execute a control means for controlling an external electronic device 300 corresponding to any one of at least two or more external electronic devices 300 corresponding to two or more selected indicators, and the electronic device 101 may display, on the display 240, a second user interface for controlling the external electronic device 300 corresponding to any one of the external electronic devices. For example, the electronic device 101 may execute a control application to display an execution screen of the control application on the display or execute a browser to access a web page.

The remaining external electronic devices 300, excluding the external electronic device 300 corresponding to any one of the external electronic devices, may be executed in the background of the electronic device 101. In another example, the electronic device 101 may execute the control means of the electronic device 101 to control at least two or more external electronic devices 300 corresponding to two or more selected indicators and display, on the display 240, a second user interface for controlling two or more external electronic devices 300 on one screen. The disposition of the second user interface for controlling two or more external electronic devices 300 on one screen by the electronic device 101 will be described later with reference to FIGS. 9 and 10.

In an embodiment, the electronic device 101 may control external electronic device 300 through a user input to the second user interface displayed through the display 240. For example, the electronic device 101 may transmit a control command to the external electronic device 300 through wireless communication connected with the external electronic device 300 or transmit a control command to another device (e.g., a server) providing services to the external electronic device 300.

According to another embodiment, at least some of the operations shown in the flowchart 500 may be performed by the external electronic device 300. For example, if the electronic device 101 transmits a connection request including connection information on the electronic device 101 to the external electronic device, the external electronic device 300 may perform operations corresponding to operation 501 and operation 503, and the external electronic device 300, in response to a user input to the first user interface, may execute or install the control means determined as described above in operation 505, thereby establishing a connection for the electronic device 101 to control the external electronic device 300.

Figure 6:
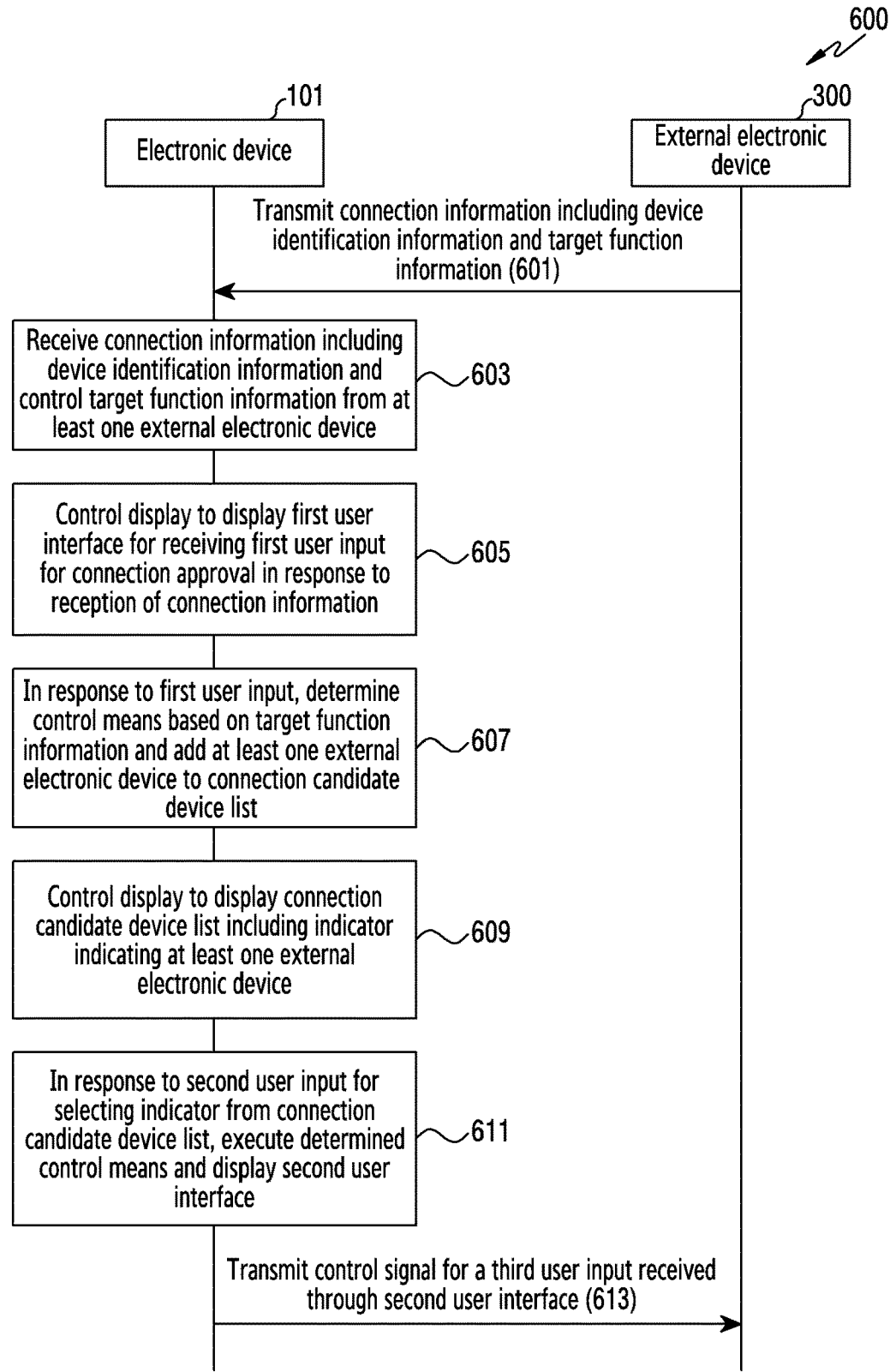
FIG. 6 is an operation flowchart illustrating a process of an electronic device controlling external electronic devices according to an embodiment.

FIG. 6 is an operation flowchart 600 illustrating a process of an electronic device 101 controlling external electronic devices 300 according to an embodiment.

In an embodiment, external electronic device 300 may transmit connection information including device identification information and target function information in operation 601. In an example, prior to operation 601, the electronic device 101 may transmit, to external electronic device 300, a connection request signal for a connection with external electronic device 300. External electronic device 300 may transmit connection information including device identification information and target function information to the electronic device 101 in response to the connection request signal of the electronic device 101.

According to an embodiment, in operation 603, the electronic device 101 (e.g., the processor 410 in FIG. 5) may receive connection information including device identification information and control target function information from external electronic device 300.

In an embodiment, the processor 410 may obtain a device name of the external electronic device 300, operating system identification information of the external electronic device 300, and/or a network address of the external electronic device 300 from the device identification information received from external electronic device 300.

In an embodiment, the processor 410 may obtain identification information of an application executing on the external electronic device 300 from the target function information received from the external electronic device 300.

According to an embodiment, in operation 605, the electronic device 101 (e.g., the processor 410 in FIG. 4) may control the display to display a first user interface for receiving a first user input indicating connection approval in response to receipt of the connection information.

In an embodiment, the processor 410 may approve a connection for external electronic device 300 that is to be controlled by the electronic device 101, among external electronic device 300 that transmitted the connection information through the first user input to the first user interface.

According to an embodiment, in operation 607, the electronic device 101 (e.g., the processor 410 in FIG. 4), in response to the first user input, may determine a control means, based on the target function information, and add external electronic device 300 to the connection candidate device list.

In an embodiment, the processor 410 may add, to the candidate device list, external electronic device 300 approved for connection with the electronic device 101 by the first user input according to operation 605.

In an embodiment, the processor 410 may determine a control means, based on operating system identification information of external electronic device 300 and information about an application executing on external electronic device 300. For example, if the target function information of the external electronic device 300 indicates that the application executing on the external electronic device 300 is a presentation application, the control means may be a control application providing the presentation control tool.

According to an embodiment, in operation 609, the electronic device 101 (e.g., the processor 410 in FIG. 4) may control the display 240 to display a connection candidate device list including an indicator indicating external electronic device 300.

In an embodiment, the processor 410 may output, to the display 240, a connection candidate device list including an indicator indicating external electronic device 300 that is approved for connection with the electronic device 101 by the first user input. For example, if external electronic device 300 approved for connection with the electronic device 101 by the first user input is the first device 301 (e.g., a desktop PC) and the second device 302 (e.g., a tablet PC), the processor 410 may output a connection candidate device list including indicators indicating the first device 301 and the second device 302 through the display 240.

According to an embodiment, in operation 611, the electronic device 101 (e.g., the processor 410 in FIG. 4), in response to a second user input for selecting the indicator from the connection candidate device list, may execute the determined control means and display a second user interface.

In an embodiment, the processor 410 may select an indicator corresponding to external electronic device 300 that is to be controlled by the electronic device 101 by the second user input from the connection candidate device list including the indicator indicating external electronic device 300 through operation 609.

In an embodiment, the processor 410 may execute a control means for controlling external electronic device 300 corresponding to the indicator selected by the second user input.

In an embodiment, the processor 410 may display, on the display 240, a second user interface for controlling external electronic device 300 corresponding to the selected indicator.

According to an embodiment, in operation 613, the electronic device 101 (e.g., the processor 410 in FIG. 4), in response to a fourth user input that is input through the second user interface, may transmit, to external electronic device 300, control information for controlling an application executing on external electronic device 300.

Figure 7:
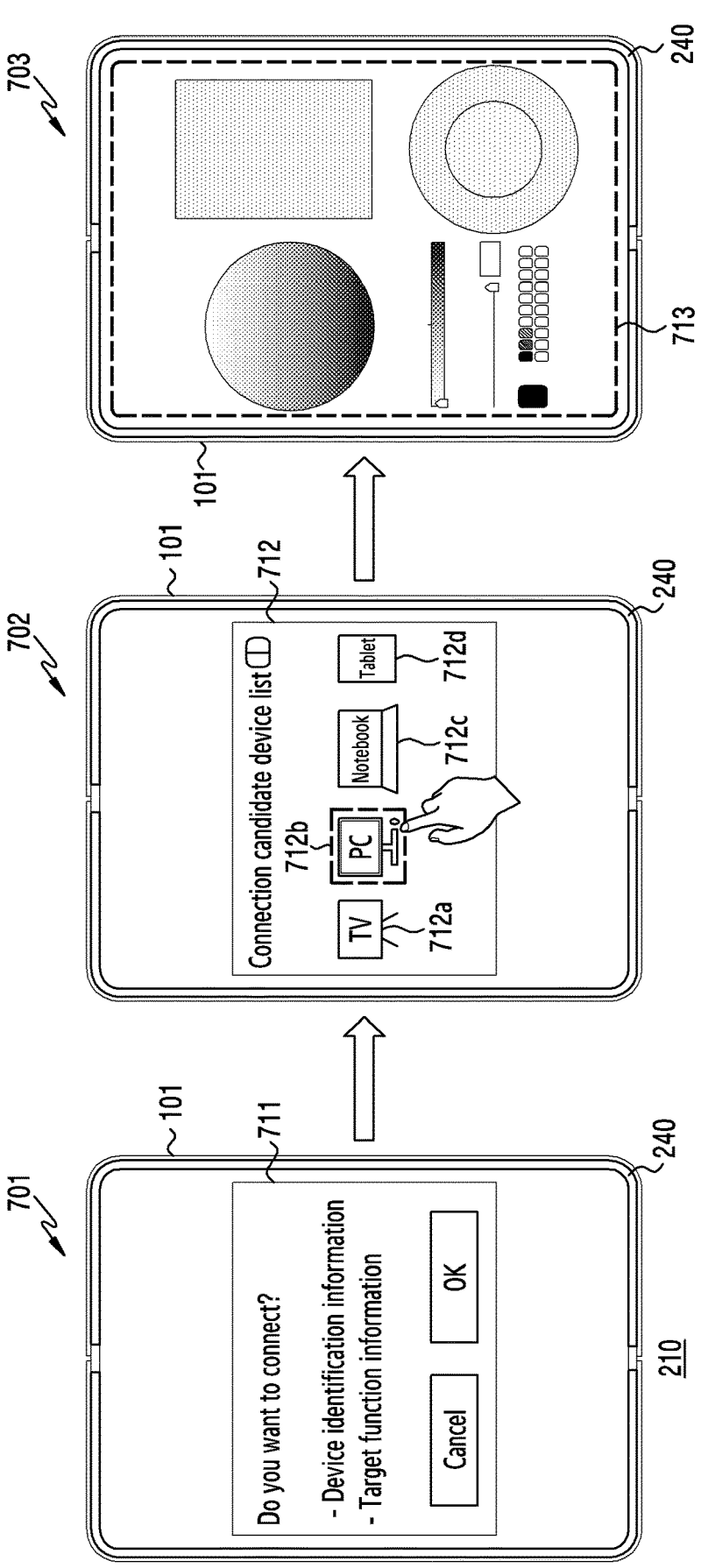
FIG. 7 illustrates various user interfaces provided through a display of an electronic device for controlling external electronic devices according to an embodiment.

FIG. 7 illustrates various user interfaces provided through a display 240 of an electronic device 101 for controlling external electronic devices 300 according to an embodiment.

According to an embodiment, a state 701 of the electronic device 101 may be a state of displaying a first user interface 711 for receiving a first user input indicating connection approval on the display 240 in response to receipt of connection information from external electronic device 300. For example, if the electronic device 101 receives connection information from the second device 302, the electronic device 101 may display, on the display 240, a first user interface 711 for whether to approve a connection request for the second device 302 in response to the receipt of the connection information.

In an embodiment, the first user interface 711 for receiving a first user input may include an object related to a connection request for external electronic device 300 that transmitted connection information. In an example, the first user interface 711 may include an object for approving a connection request of external electronic device 300 that transmitted connection information and an object for not approving the connection request. In an example, the first user interface 711 may include an object capable of identifying device identification information and target function information transmitted from external electronic device 300.

According to an embodiment, a state 702 of the electronic device 101 may be a state of displaying, on the display 240, a connection candidate device list 712 including external electronic device 300 of which the connection request was approved by a first user input to the first user interface.

In an embodiment, the connection candidate device list 712 displayed on the display 240 may include an indicator indicating external electronic device 300 of which the connection request was approved by the first user input in the state 701. For example, if a connection request for the third device 303 (e.g., a smart TV) that transmitted connection information is approved by a first user input, the third device 303 may be added to the connection candidate device list. In an example, the electronic device 101 may display an indicator 712a indicating the third device 303 on the display 240.

In an embodiment, the electronic device 101 may obtain information about external electronic device 300 to be controlled by the electronic device 101 through a second user input for indicator added to the connection candidate device list 712.

According to an embodiment, a state 703 of the electronic device 101 may be a state in which a control means for an external electronic device 300 corresponding to indicator selected according to the second user input is executed and in which a second user interface 713 is displayed on the display 240.

In an embodiment, for example, if a second indicator 712b is selected by the second user input in the state 702, the electronic device 101 may execute a control means for an external electronic device 300 (e.g., the first device 301) corresponding to the second indicator 712b. In an example, the control means for the external electronic device 300 corresponding to the second indicator 712b may be determined based on connection information including target function information received from the external electronic device 300 corresponding to the second indicator 712b. For example, the external electronic device 300 corresponding to the second indicator 712b may correspond to the first device 301. In this case, if target function information transmitted by the first device 301 indicates an image editing application, the control means of the electronic device 101 may be an application providing an image editing tool.

Figure 8:
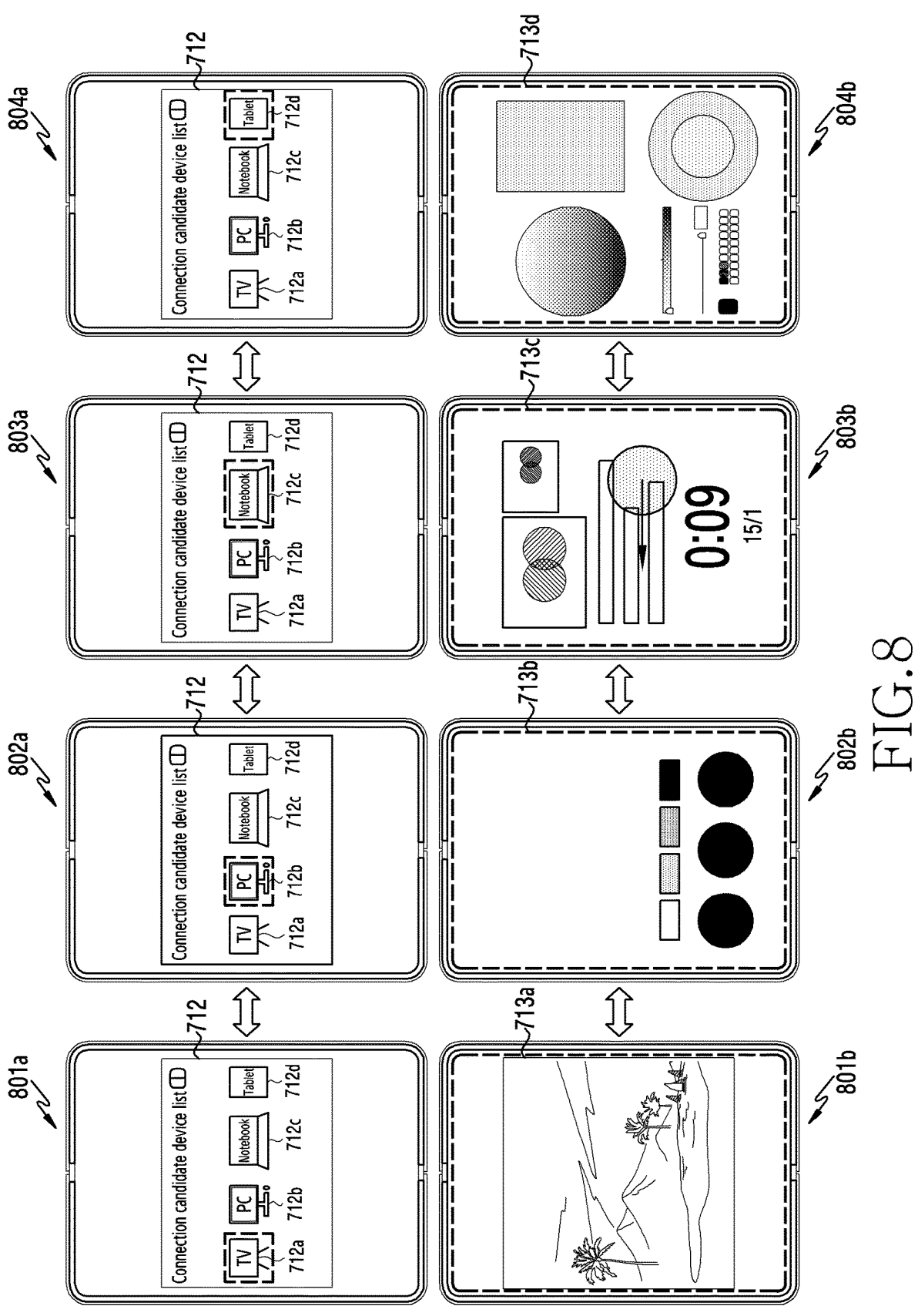
FIG. 8 illustrates a display screen of an electronic device that switches as an indicator is selected from a connection candidate device list according to an embodiment.

FIG. 8 illustrates a display 240 screen of an electronic device 101 that switches as an indicator is selected from a connection candidate device list 712 according to an embodiment.

Referring to FIG. 8, a state 801a of the electronic device 101 may be a state in which a first indicator 712a is selected by a second user input from among the indicators indicating external electronic device 300. A state 801b of the electronic device 101 shows a second user interface 713a displayed on the display 240 to control an external electronic device 300 corresponding to the first indicator 712a according to execution of a control means as the first indicator 712a is selected.

Referring to FIG. 8, a state 802a of the electronic device 101 shows a state in which a second indicator 712b is selected by a second user input from among the indicators indicating external electronic device 300. A state 802b of the electronic device 101 shows a second user interface 713b displayed on the display 240 to control an external electronic device 300 corresponding to the second indicator 712b according to execution of a control means as the second indicator 712b is selected. For example, if the external electronic device 300 corresponding to the second indicator 712b is the first device 301 and if target function information running by the first device 301 indicates a game application, the control means may be an application providing a game control tool. The electronic device 101 may execute an application providing a game control tool and display the second user interface 713b on the display 240 to control the first device 301.

Referring to FIG. 8, a state 803a of the electronic device 101 is a state in which a third indicator 712c is selected by a second user input from among the indicators indicating external electronic device 300. A state 803b of the electronic device 101 shows a second user interface 713c displayed on the display 240 to control an external electronic device 300 corresponding to the third indicator 712c according to execution of a control means as the third indicator 712c is selected. For example, if the external electronic device 300 corresponding to the third indicator 712c is the fourth device 304 and if target function information running by the fourth device 304 indicates a presentation application, the control means may be a control application providing a presentation control tool. The electronic device 101 may execute the control application providing a presentation control tool and display the second user interface 713*c* on the display 240 to control the fourth device 304.

Referring to FIG. 8, a state 804*a* of the electronic device 101 shows a state in which a fourth indicator 712*d* is selected by a second user input from among the indicators indicating external electronic device 300. A state 804*b* of the electronic device 101 shows a second user interface 713*d* displayed on the display 240 to control an external electronic device 300 corresponding to the fourth indicator 712*d*. For example, if the external electronic device 300 corresponding to the fourth indicator 712*d* is the second device 302 and if target function information running by the second device 302 indicates an image editing application, the control means may be a control application providing an image editing tool. The electronic device 101 may execute an application providing an image editing tool and display the second user interface 713*d* on the display 240 to control the second device 302.

In an embodiment, the electronic device 101 may switch external electronic device 300 to be controlled by a second user input for the indicator indicating external electronic device 300.

Figure 9:
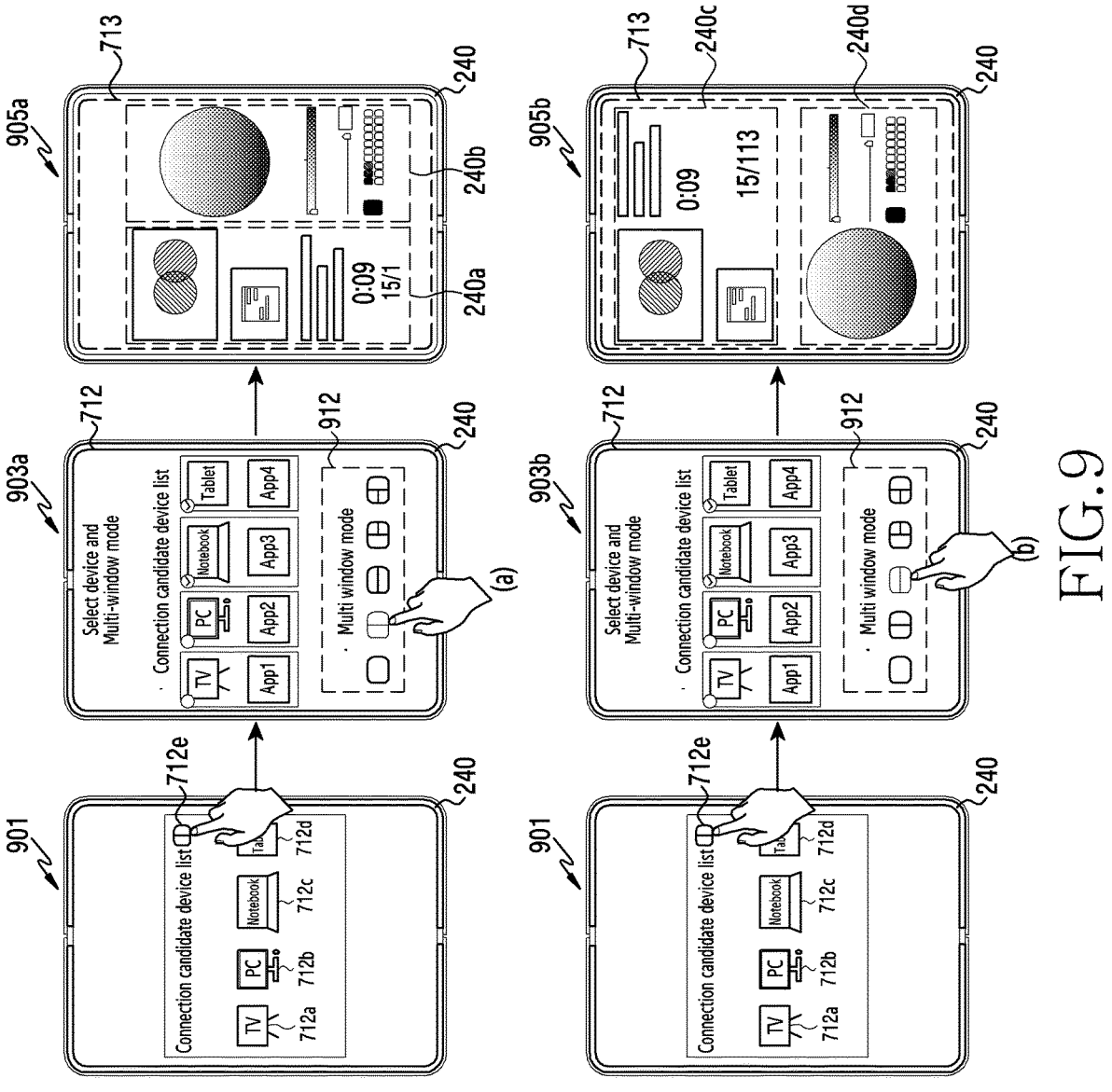
FIG. 9 illustrates various user interfaces provided through a display of an electronic device for controlling external electronic devices according to an embodiment.

FIG. 9 illustrates various user interfaces provided through a display 240 of an electronic device 101 for controlling external electronic devices 300 according to an embodiment.

Referring to FIG. 9, a state 901 and a state 903*a* of the electronic device 101 show the state in which a connection candidate device list 712 is displayed on the display 240 of the electronic device 101. In an example, the connection candidate device list 712 may include an indicator indicating external electronic device 300 with which a connection request is approved by a first user input, and an object 712*e*. In an example, the electronic device 101 may display, on the display 240, a third user interface 912 for receiving an input for selecting the layout of disposition of a second user interface 713 according to an indicator selected in response to an input to the object 712*e*. In the state 903*a* in which a screen including the third user interface 912 is displayed, the electronic device 101 may select a plurality of external electronic devices 300 from among the connection candidate device list in response to a user input. According to an embodiment, the layout list displayed or activated in the third user interface 912 may vary depending on the number of the selected external electronic devices 300.

In an embodiment, the electronic device 101 may select indicator by a second user input. For example, the electronic device 101 may select a third indicator 712*c* and a fourth indicator 712*d* by a second user input. In an example, the layout of disposition of the second user interface 713 displayed on the display 240 according to the selected third indicator 712*c* and fourth indicator 712*d* may be selected by a third user input to the third user interface 912. A layout in which two areas are vertically divided by a third user input to the third user interface 912 may be selected for the disposition of the second user interface 713 displayed on the display 240 according to the selected third indicator 712*c* and fourth indicator 712*d*.

According to an embodiment, a state 905*a* of the electronic device 101 shows a state indicating the disposition of the second user interface 713 displayed on the display 240 according to the selected indicator. In an example, the second user interface 713 according to the third indicator 712*c* may be disposed in a first area 240*a* of the display 240, and the second user interface 713 according to the fourth indicator 712*d* may be disposed in the second area 240*b* of the display 240 by a third user input to the layout in which two areas are vertically divided. In an example, the second user interface 713 according to the fourth indicator 712*d* may be disposed in the first area 240*a* of the display 240.

According to an embodiment, in a state 903*b* of the electronic device 101, the disposition of the second user interface 713 displayed on the display 240 according to the selected third indicator 712*c* and fourth indicator 712*d* may be selected as a layout in which two areas are horizontally divided by a third user input to the third user interface 912.

According to an embodiment, in a state 905*b* of the electronic device 101, the second user interface 713 according to the third indicator 712*c* may be disposed in a third area 240*c* of the display 240, and the second user interface 713 according to the fourth indicator 712*d* may be disposed in a fourth area 240*d* of the display by a third user input to the layout in which two areas are horizontally divided.

Figure 10:
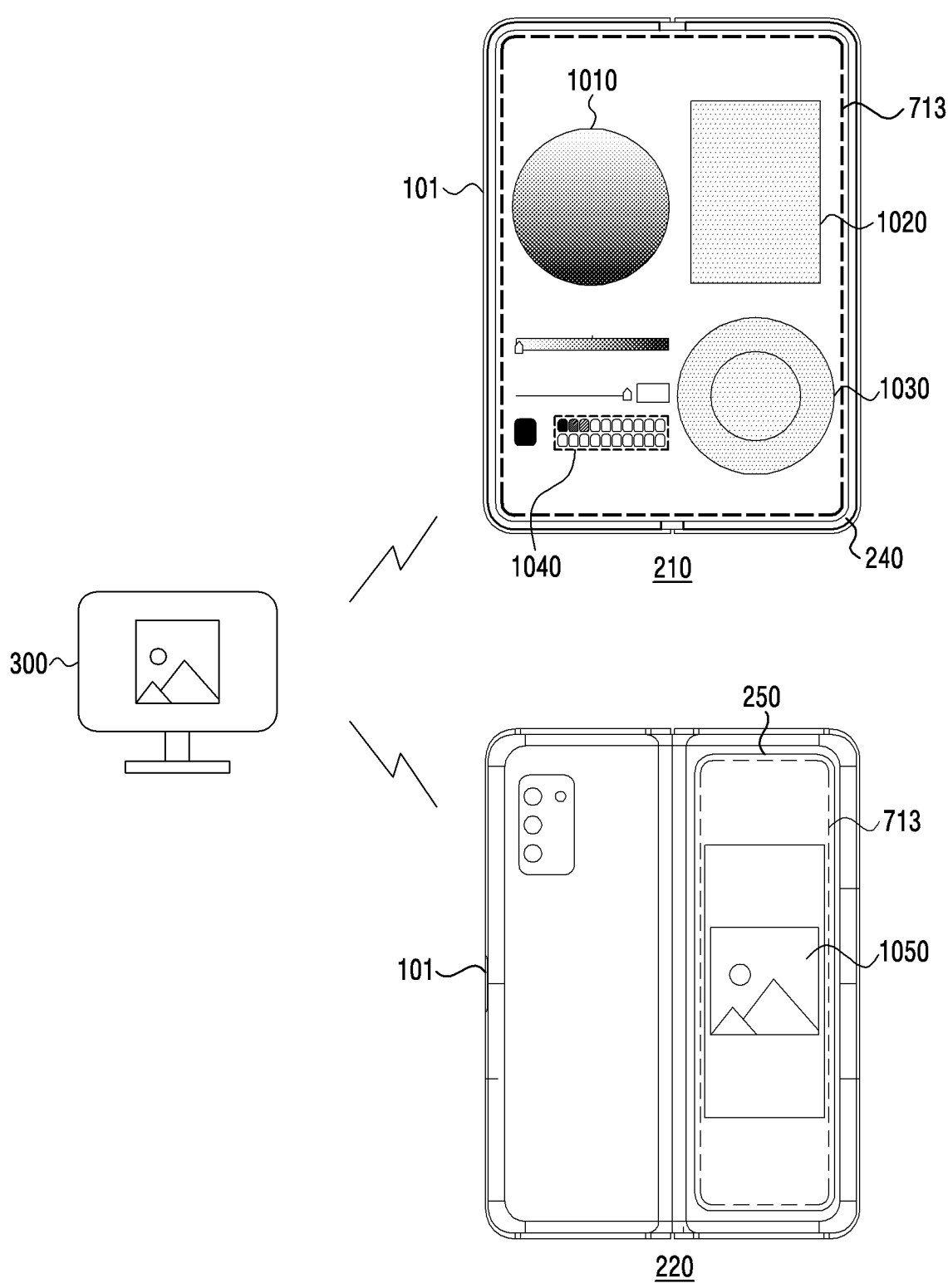
FIG. 10 illustrates an exemplary second user interface provided through a display of an electronic device according to an embodiment.

FIG. 10 illustrates an exemplary second user interface 713 provided through a display 240 of an electronic device 101 according to an embodiment.

Referring to FIG. 10, the electronic device 101 may execute a control means for an external electronic device 300 corresponding to an indicator selected by a second user input and display a second user interface 713 on the display 240.

For example, if an external electronic device 300 connected with the electronic device 101 is executing an image editing application, and if target function information transmitted from the external electronic device 300 indicates an image editing application according thereto, the electronic device 101 may determine a control means as a control application providing an image editing tool. In an example, the electronic device 101 may execute control application providing an image editing tool corresponding to the control means.

Referring to FIG. 10, the electronic device 101 may display a second user interface 713 on the display 240 of the electronic device 101 according to execution of the control application providing an image editing tool corresponding to the control means. In an example, the electronic device 101 may display the second user interface 713 on the secondary display 250 of the electronic device 101.

In an embodiment, if the electronic device 101 executes an application providing an image editing tool corresponding to the control means, the processor 410 may display a second user interface 713 for performing functions related to image editing on the display 240. For example, the second user interface 713 may include a palette object 1010 for selecting colors, a touch pad object 1020 for screen movement, pointer movement, and/or magnification and reduction, a jog dial object 1030 for size adjustment and/or rotation, and/or a preset object 1040 for storing specific colors.

In an embodiment, the processor 410 may display an object 1050 indicating a screen being output in the external electronic device 300 on the secondary display 250 of the electronic device 101.

In an embodiment, the electronic device 101 may obtain control information for controlling the image editing application executing on the external electronic device 300 by a fourth user input to the second user interface 713.

FIGS. 11A to 11F illustrate examples of utilizing a second user interface 713 provided through a screen area of a display 240 of an electronic device 101 according to an embodiment.

Hereinafter, a user input may occur according to a user's request or user's selection based on a user's gesture. The user's gesture may be determined by various methods (e.g., various combinations of the number of touches, touch areas, and touch intensities). The user input may be input by a user's finger or a touch tool such as a stylus pen. The user's finger or the stylus pen may be referred to as an external input device. A pointer is a tool for touching or proximity-touching a specific portion of the display 240, and the above-described user's finger or stylus pen may be used.

Hereinafter, certain embodiments disclosed in this document are not necessarily configured separately from each other, and the features of the embodiments may be combined with each other.

Figure 11A:
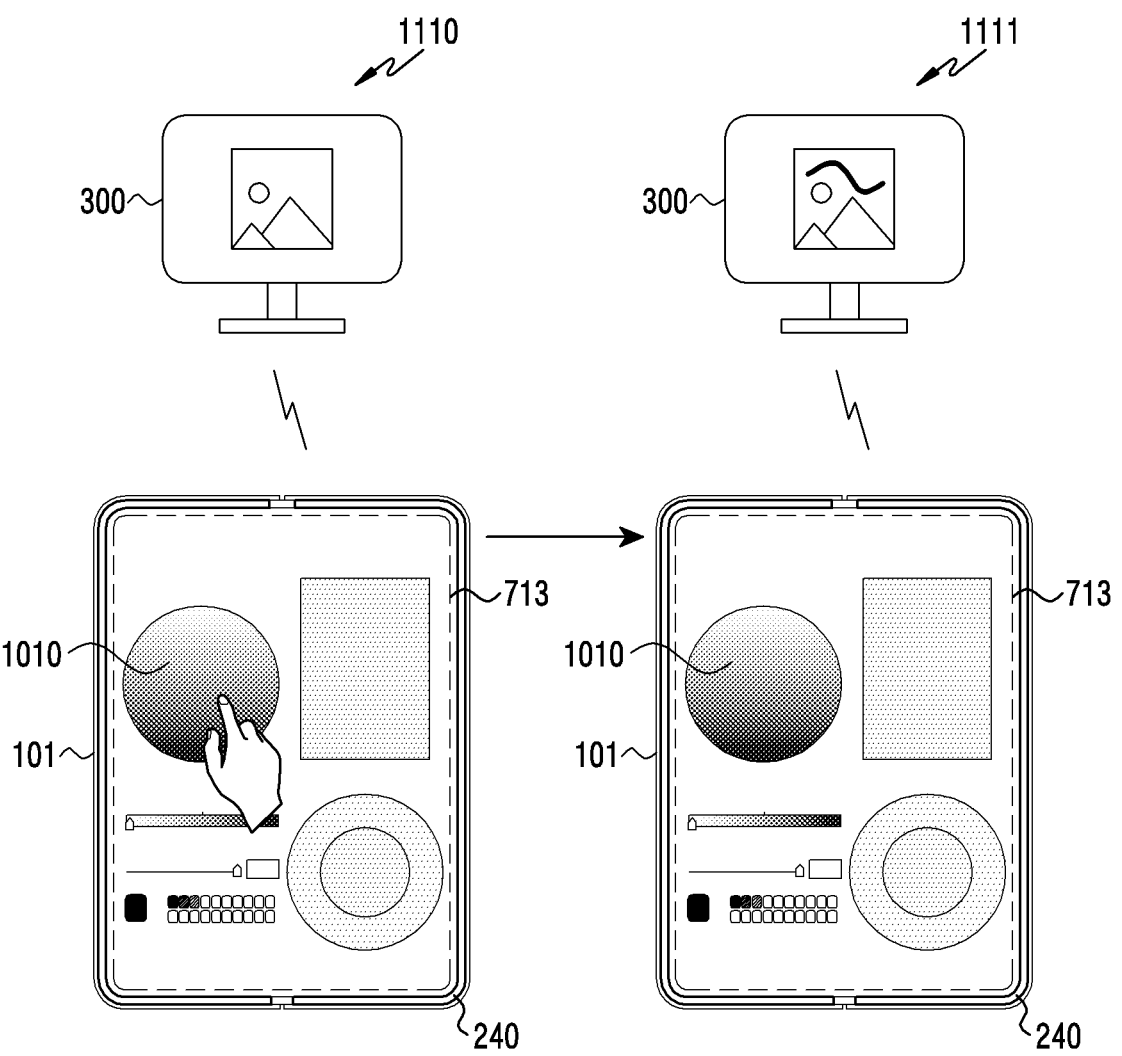
FIG. 11A illustrates an example of utilizing a second user interface provided through a display screen area of an electronic device according to an embodiment.

Referring to FIG. 11A, the electronic device 101 may edit an image output through an external electronic device 300 using a color selected by a fourth user input to the palette object 1010 displayed on the display 240.

Figure 11B:
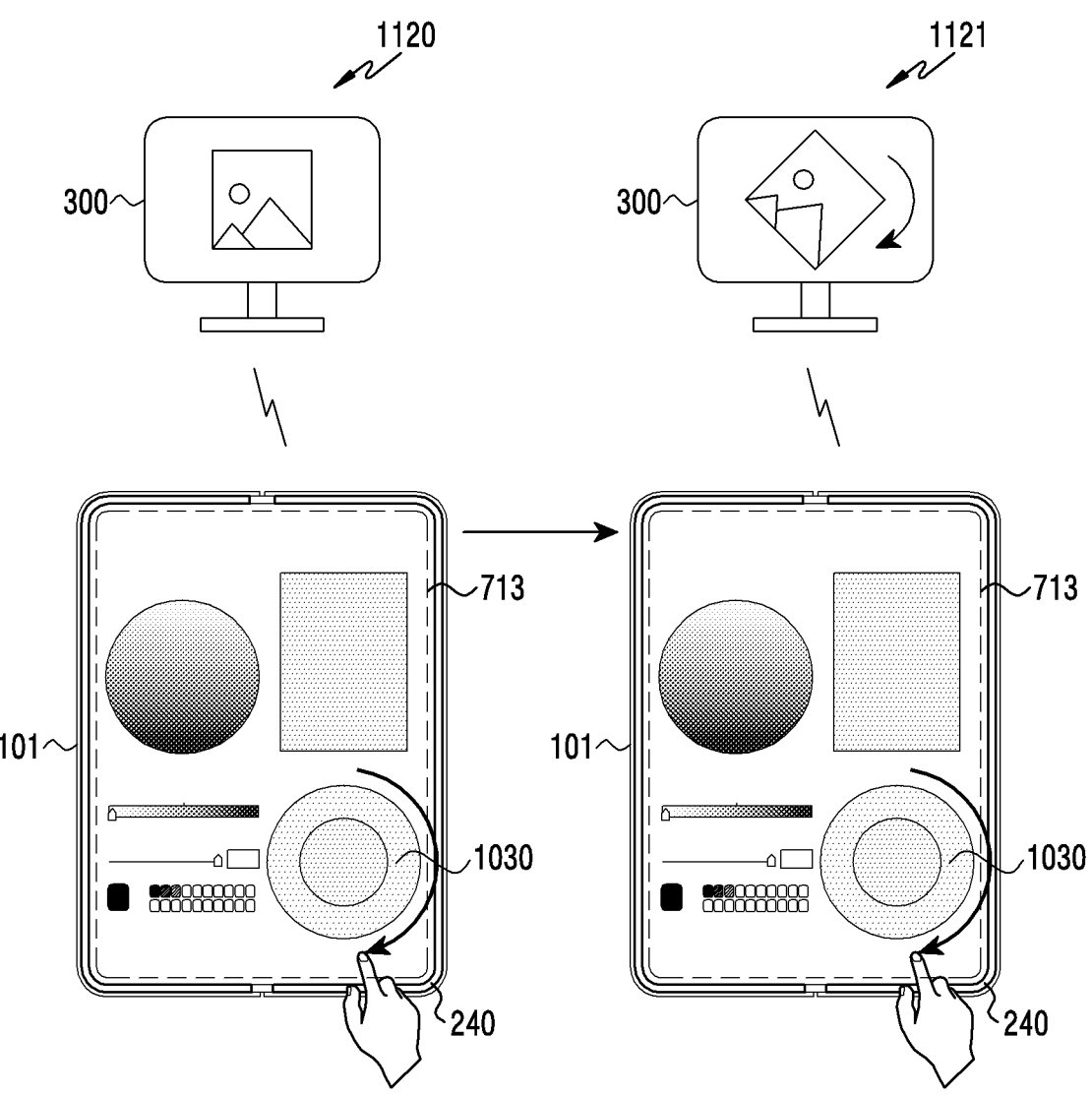
FIG. 11B illustrates an example of utilizing a second user interface provided through a display screen area of an electronic device according to an embodiment.

Referring to FIG. 11B, the electronic device 101 may rotate an image output through the external electronic device 300 by a fourth user input to the jog dial object 1030 displayed on the display 240.

Figure 11C:
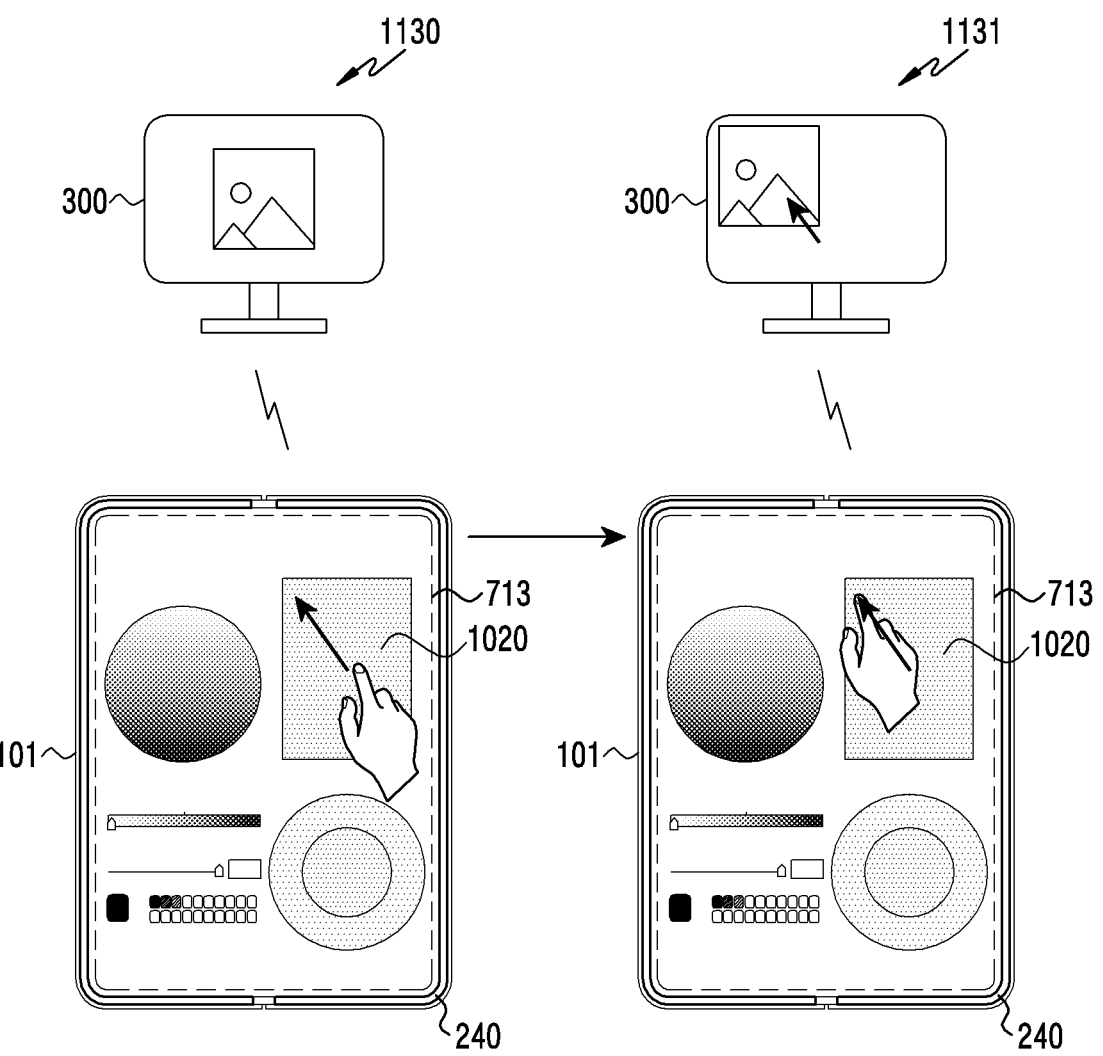
FIG. 11C illustrates an example of utilizing a second user interface provided through a display screen area of an electronic device according to an embodiment.

Referring to FIG. 11C, the electronic device 101 may move an image output through the external electronic device 300 by pointer movement according to a fourth user input produced by a user gesture (e.g., drag) onto the touch pad object 1020 displayed on the display 240.

Figure 11D:
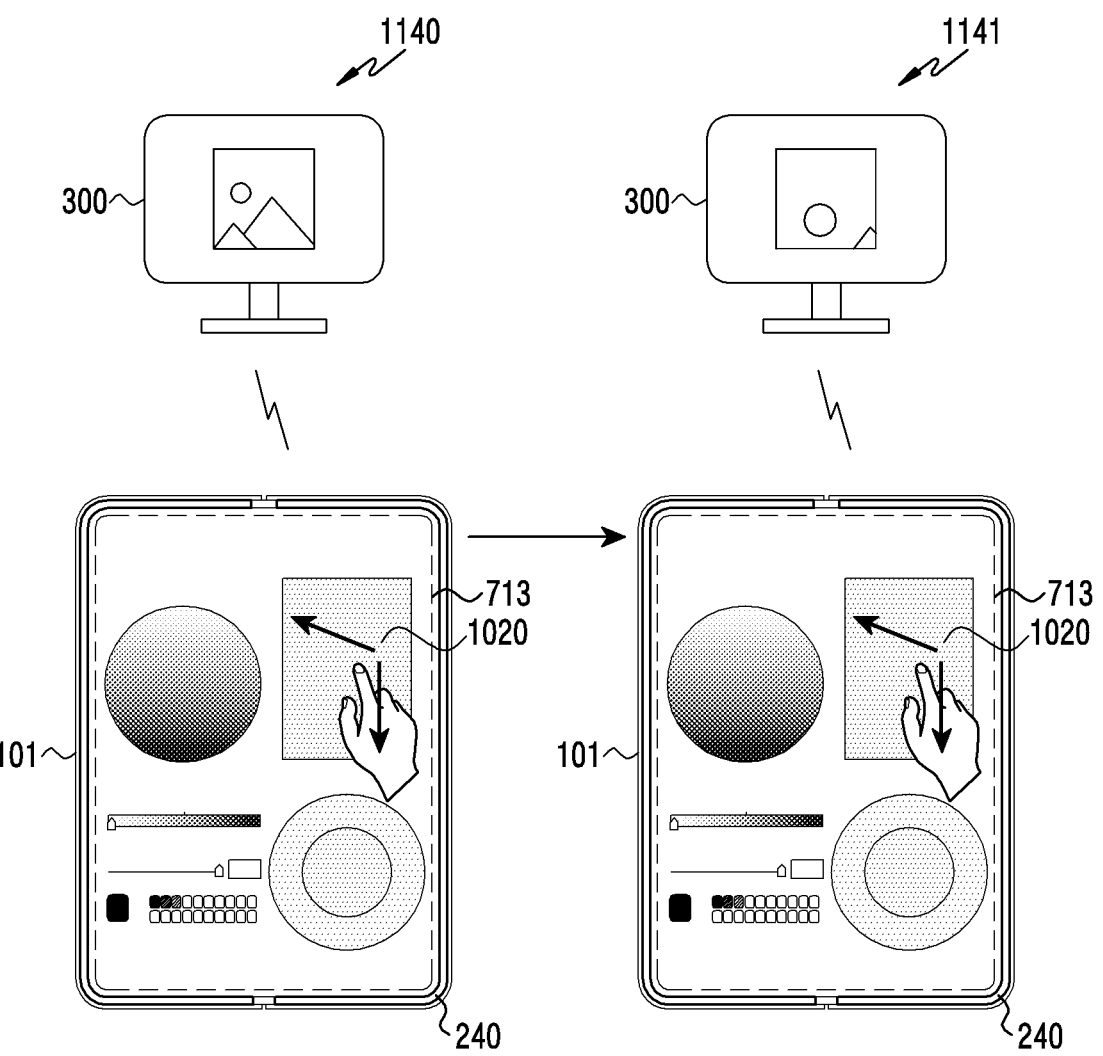
FIG. 11D illustrates an example of utilizing a second user interface provided through a display screen area of an electronic device according to an embodiment.

Referring to FIG. 11D, in an example, the electronic device 101 may enlarge an image output through the external electronic device 300 by a fourth user input produced by a user gesture (e.g., swipe) onto the touch pad object 1020.

Figure 11E:
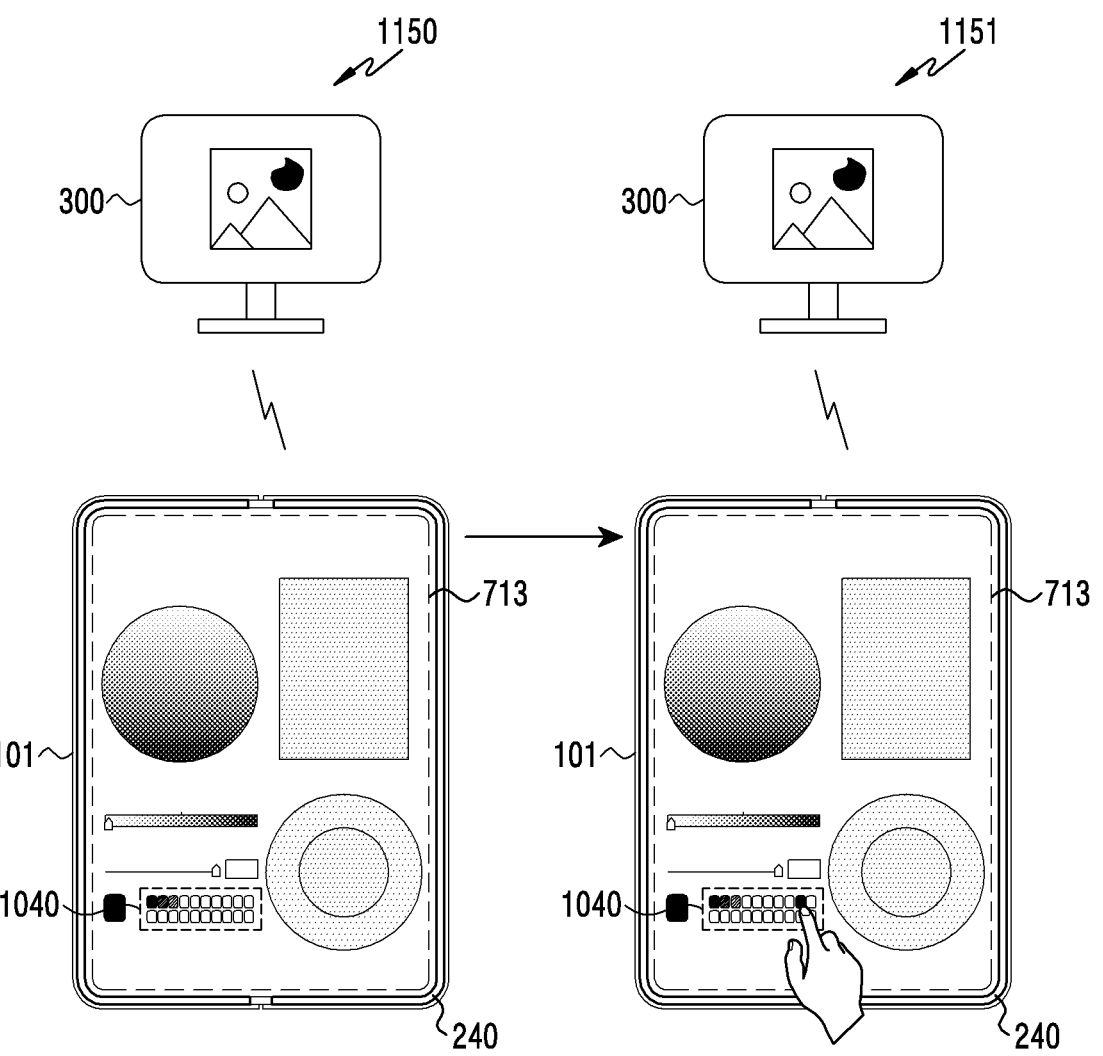
FIG. 11E illustrates an example of utilizing a second user interface provided through a display screen area of an electronic device according to an embodiment.

Referring to FIG. 11E, the electronic device 101 may select a specific color from an image output through the external electronic device 300 by a fourth user input to the touch pad object 1020 displayed on the display 240 and store the selected specific color by a fourth user input to the preset object 1040.

Figure 11F:
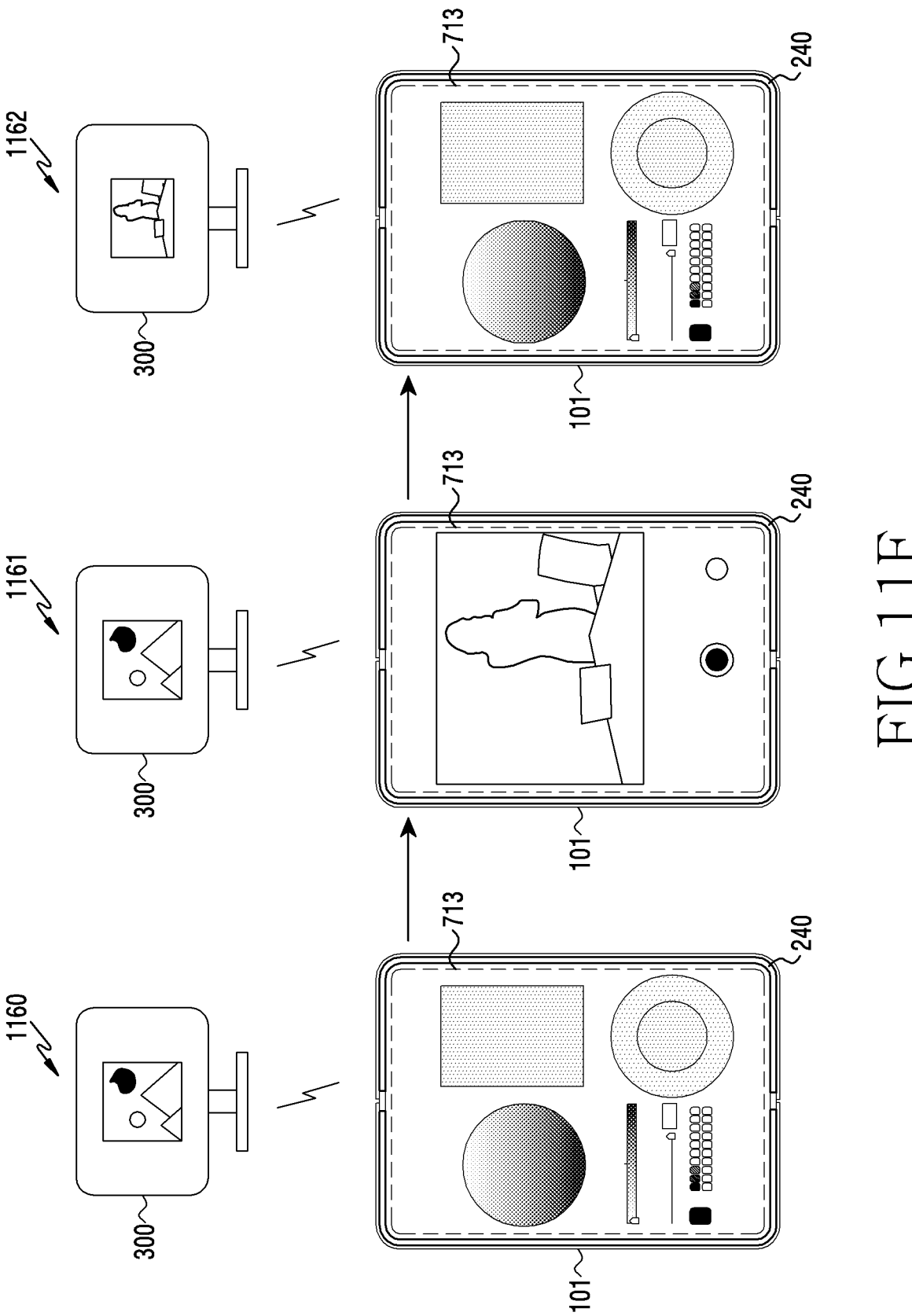
FIG. 11F illustrates an example of utilizing a second user interface provided through a display screen area of an electronic device according to an embodiment.

Referring to FIG. 11F, the electronic device 101 may capture images and/or videos using the camera module 260. In an example, the external electronic device 300 may output images and/or videos captured using the camera module 260 of the electronic device 101 in real time.

Figure 12:
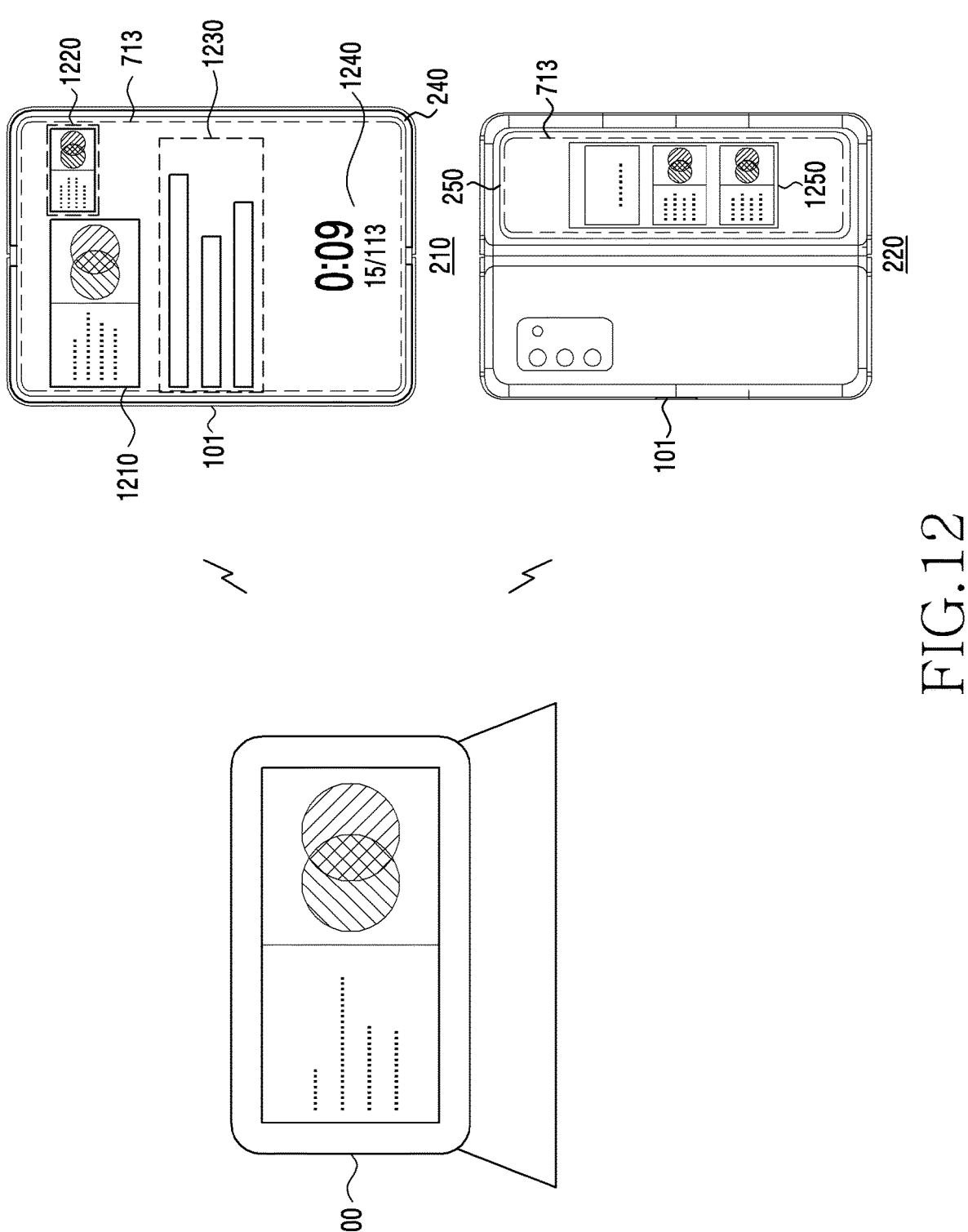
FIG. 12 illustrates an exemplary second user interface provided through a display of an electronic device according to an embodiment.

FIG. 12 illustrates an exemplary second user interface 713 provided through a display 240 of an electronic device 101 according to an embodiment.

In an embodiment, if an external electronic device 300 connected with the electronic device 101 is executing a presentation application, and if target function information received by the external electronic device 300 indicates a presentation application according thereto, the electronic device 101 may determine a control means to be a presentation control application. In an example, the electronic device 101 may execute a presentation control application corresponding to the control means.

Referring to FIG. 12, the electronic device 101 may display a second user interface 713 on the display 240 of the electronic device 101 according to the execution of the presentation control application corresponding to the control means. In an example, the electronic device 101 may display the second user interface 713 on the secondary display 250 of the electronic device 101.

In an embodiment, if the electronic device 101 executes a presentation control application corresponding to the control means, the processor 410 may display a second user interface 713 for performing functions related to presentation control on the display 240. For example, the second user interface 713 may include an object 1210 indicating the current slide, an object 1220 indicating the next slide, an object 1230 indicating presentation scripts, and an object 1240 indicating a progress time and page information.

In an embodiment, the processor 410 may display a slide thumbnail 1250 of a presentation executing on the external electronic device 300 on the secondary display 250 of the electronic device 101.

In an embodiment, the electronic device 101 may obtain control information for controlling the presentation application executing on the electronic device 300 by a fourth user input to the second user interface 713.

Figure 13A:
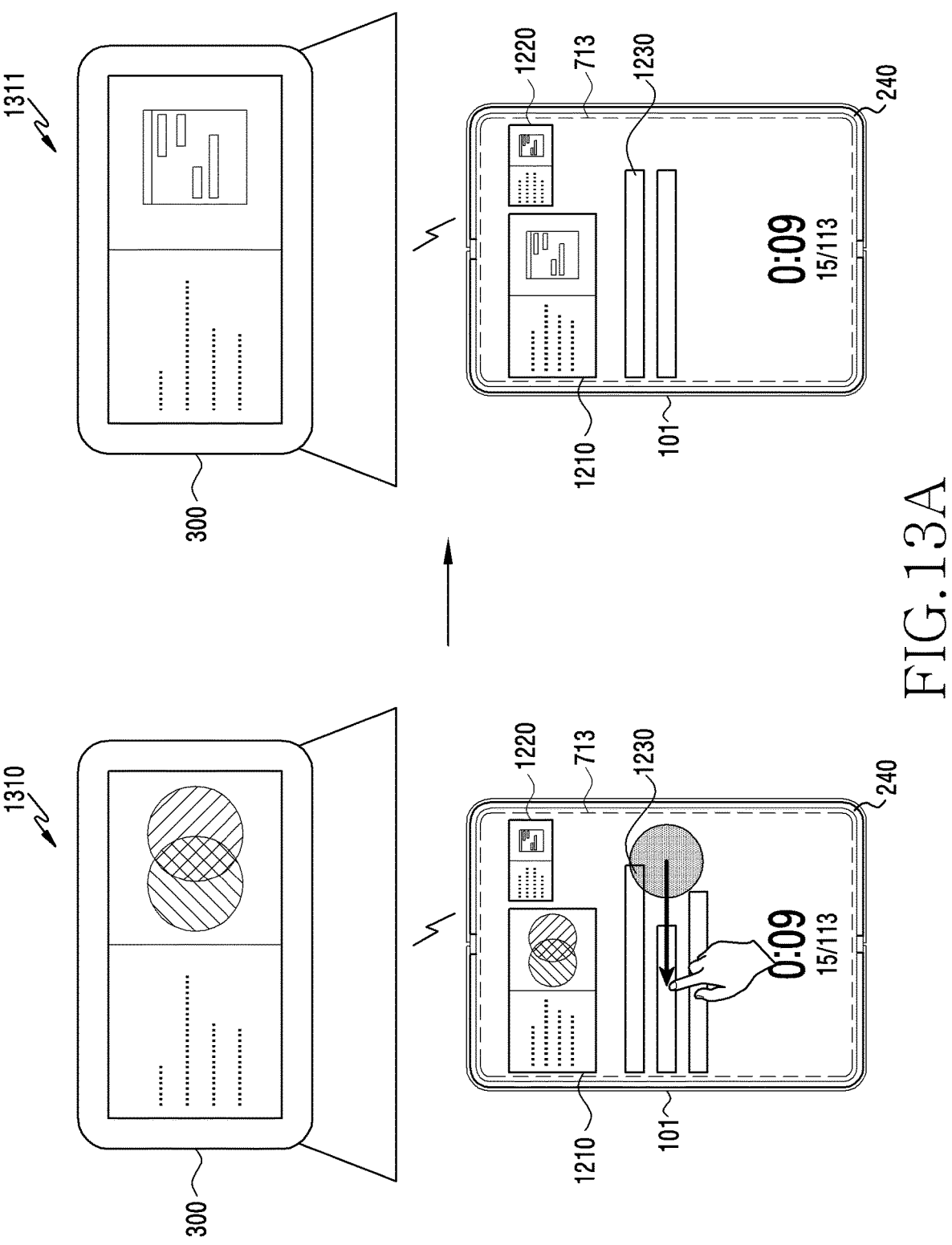
FIG. 13A illustrates an example of utilizing a second user interface provided through a display of an electronic device according to an embodiment.
Figure 13B:
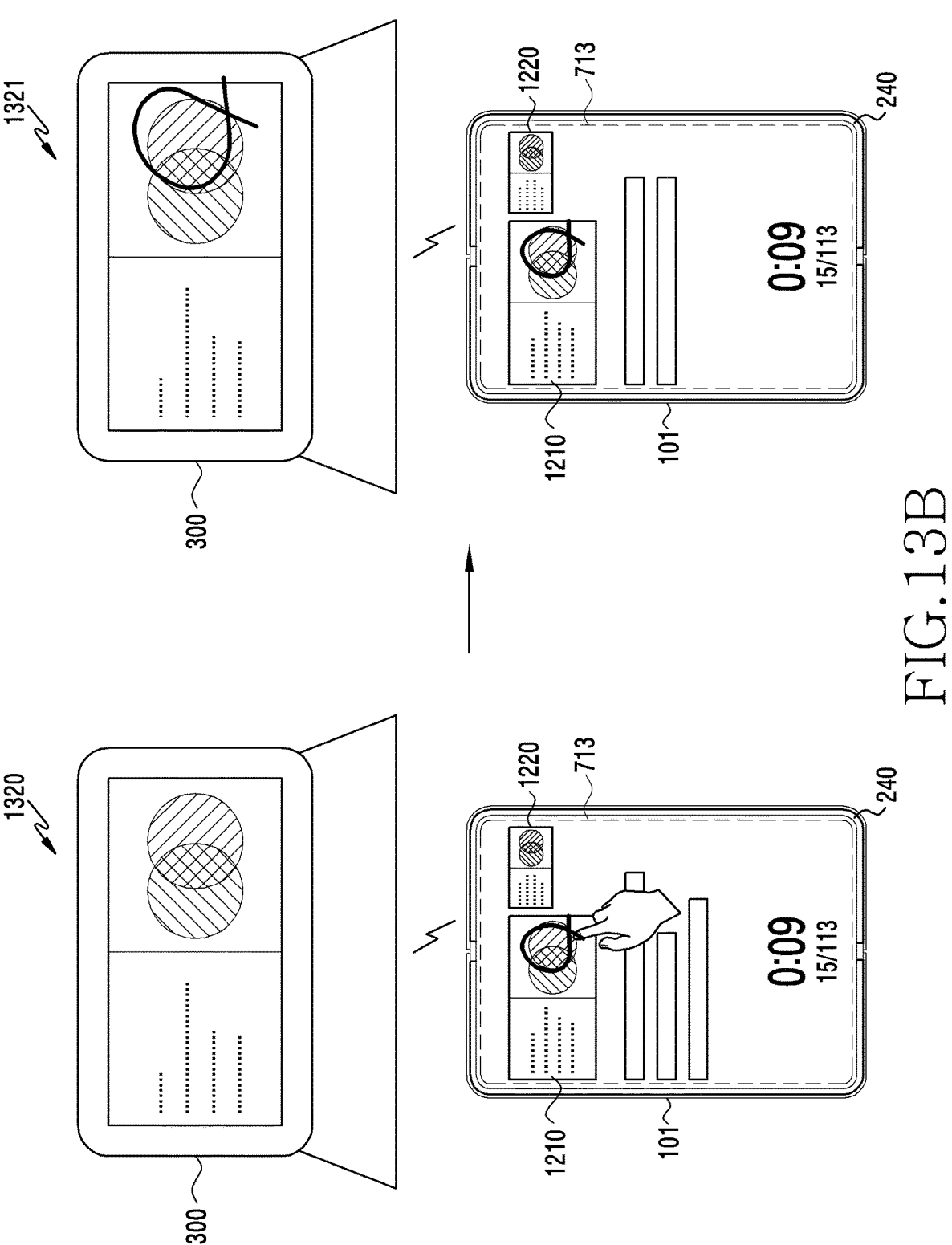
FIG. 13B illustrates an example of utilizing a second user interface provided through a display of an electronic device according to an embodiment.
Figure 13C:
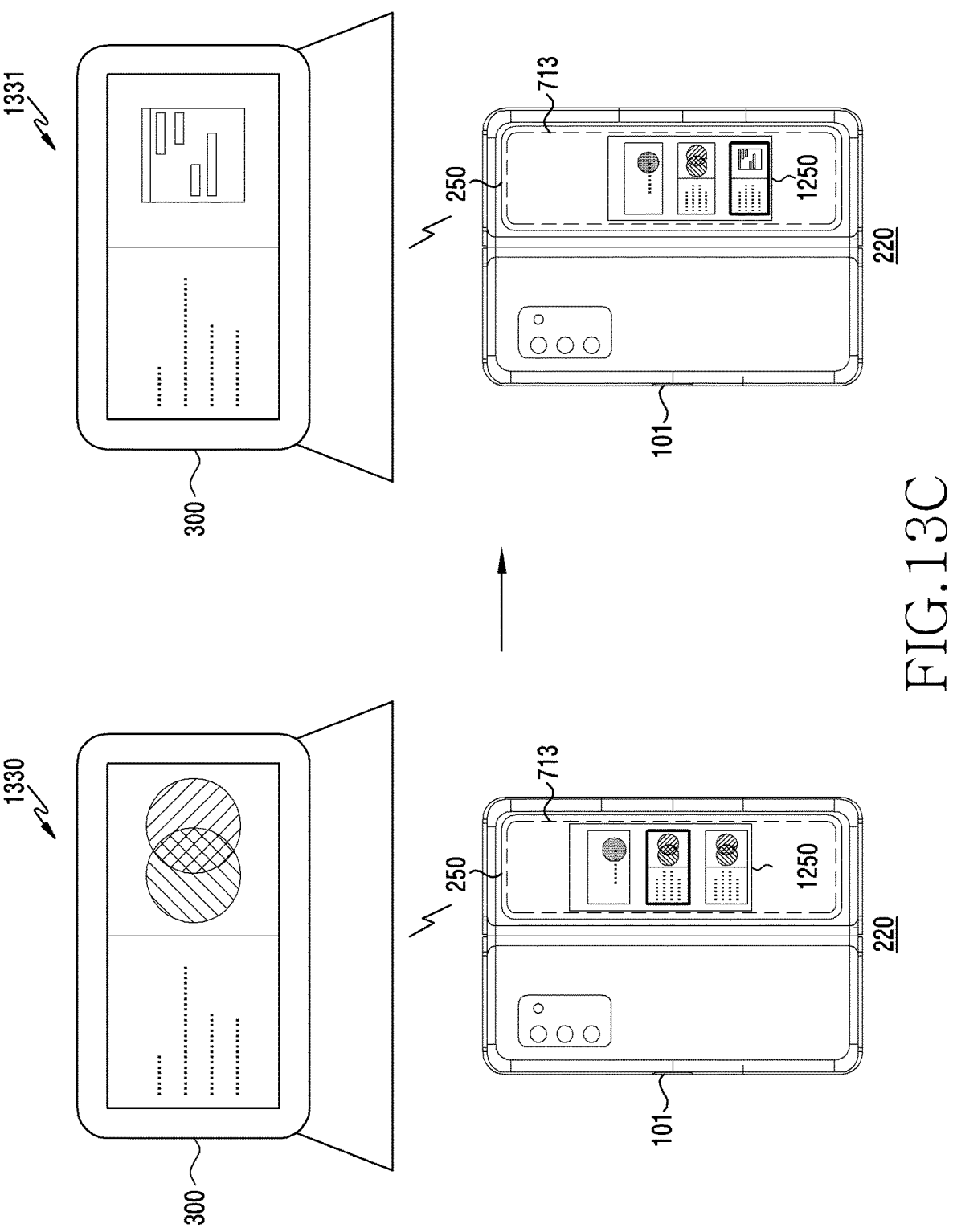
FIG. 13C illustrates an example of utilizing a second user interface provided through a display of an electronic device according to an embodiment.

FIGS. 13A to 13C illustrate examples of utilizing a second user interface 713 provided through a display 240 of an electronic device 101 according to an embodiment.

Referring to FIG. 13A, the electronic device 101 may perform control to output the next slide screen through the external electronic device 300 by a fourth user input produced through a user gesture (e.g., drag) onto the script object 1230 displayed on the display 240.

Referring to FIG. 13B, the electronic device 101 may perform control to output data input by a fourth user input through the external electronic device 300 by a fourth user input to the object 1210 indicating the current slide displayed on the display 240.

Referring to FIG. 13C, the electronic device 101 may perform control to output a slide screen selected by a fourth user input through the external electronic device 300 by a fourth user input to a slide thumbnail 1250 displayed on the secondary display 250.

Figure 14A:
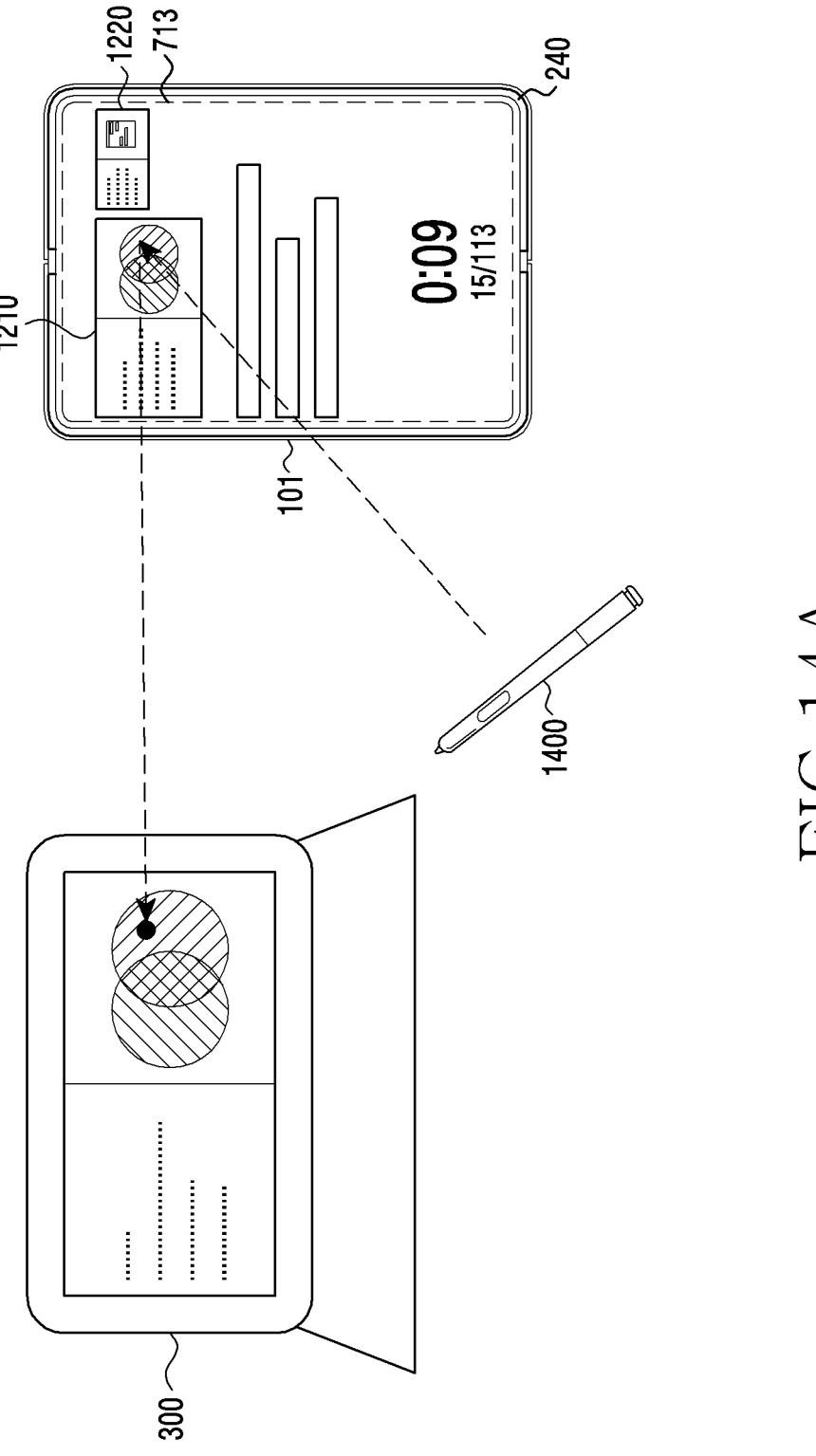
FIG. 14A illustrates an example of controlling external electronic devices using an electronic pen according to an embodiment.
Figure 14B:
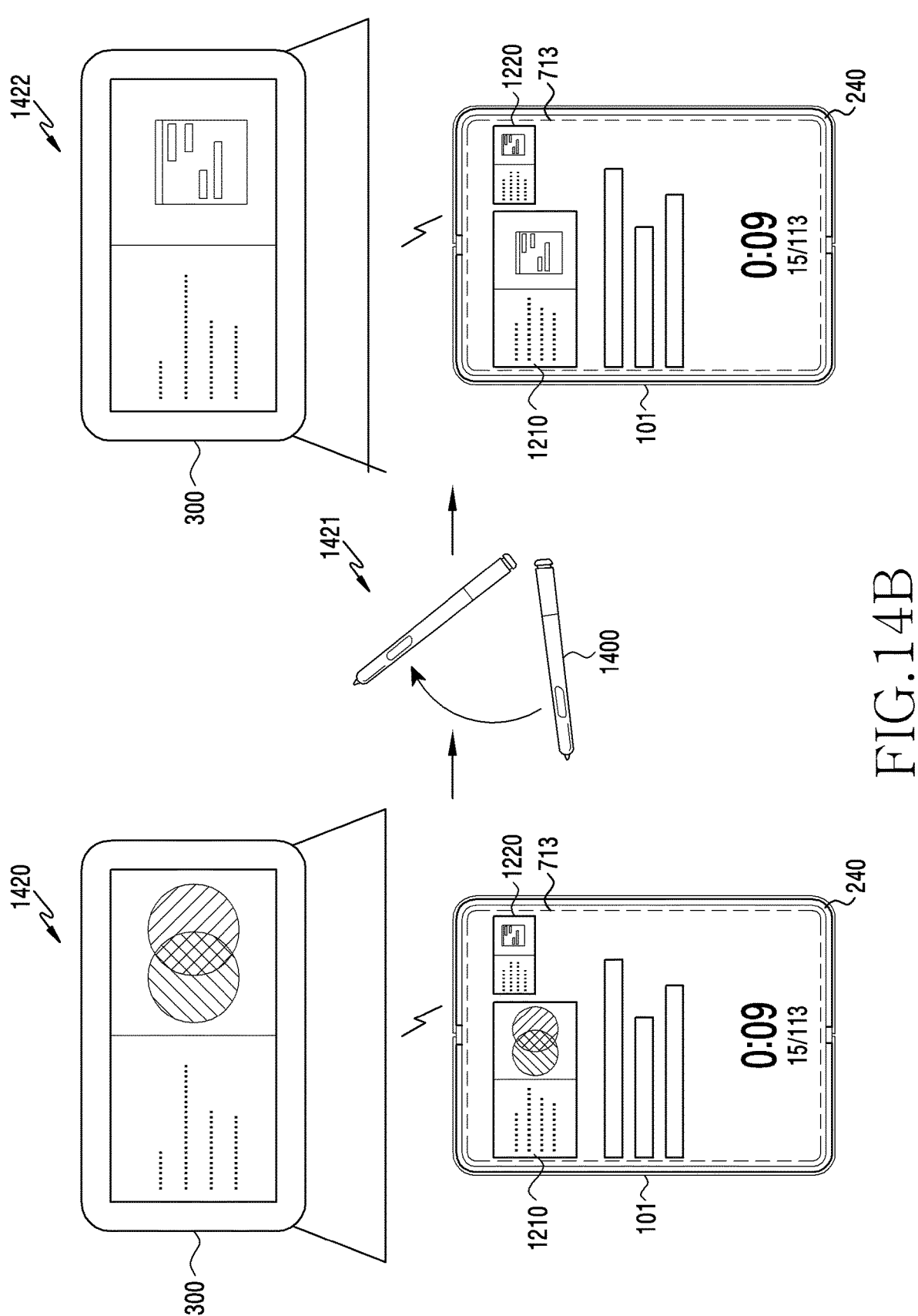
FIG. 14B illustrates an example of controlling external electronic devices using an electronic pen according to an embodiment.

FIGS. 14A to 14B illustrate examples of controlling external electronic devices 300 using an electronic pen 1400 according to an embodiment.

Referring to FIG. 14A, the electronic device 101 may obtain movement and position information of an electronic pen 1400. The electronic device 101 may output a screen reflecting movement and position information of the electronic pen 1400 through the external electronic device 300 by a fourth user input produced through obtaining movement and position information of the electronic pen 1400.

Referring to FIG. 14B, the electronic device 101 may detect a flick motion corresponding to the movement of the electronic pen 1400. For example, the electronic pen 1400 may detect an event corresponding to the flick motion using a motion sensor provided in the electronic pen 1400, and the electronic pen 1400 may transmit information about the detected event to the electronic device 101. The electronic device 101 may perform control to output the next slide screen through the external electronic device 300 by a fourth user input produced through the flick motion detection of the electronic pen 1400.

Figure 15:
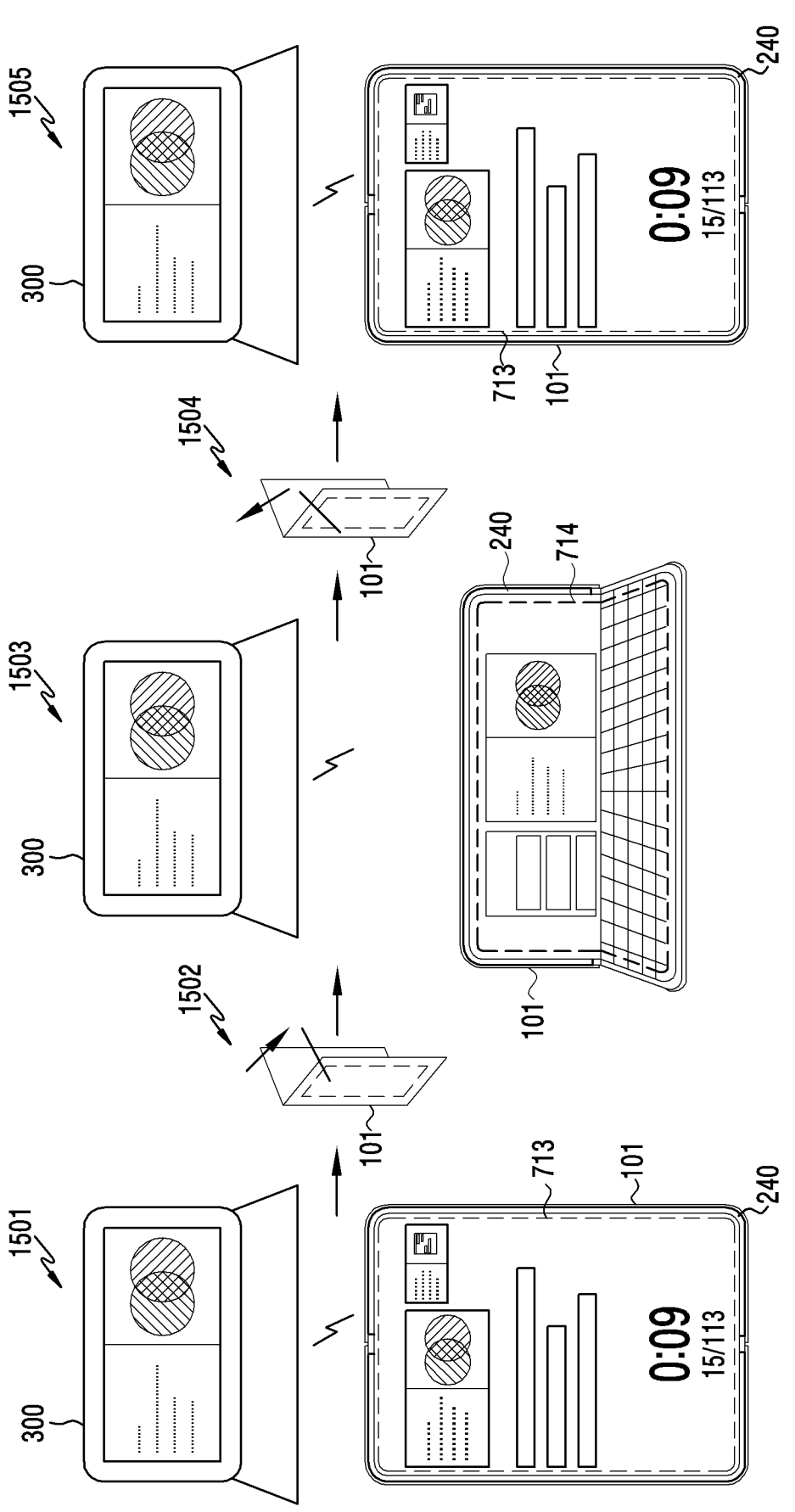
FIG. 15 illustrates a user interface that switches based on a change in a folding angle of an electronic device according to an embodiment.

FIG. 15 illustrates a user interface that switches based on a change in a folding angle of an electronic device 101 according to an embodiment.

Referring to FIG. 15, the electronic device 101 may differently display a user interface on the display 240 depending on a folding angle of the electronic device 101. The folding angle of the electronic device 101 in a fully unfolded state may be about 180 degrees (°). In an example, a state 1502 of the electronic device 101 may switch from a second user interface 713 to a fourth user interface 714, which are displayed on the display 240, if the folding angle of the electronic device 101 changes into a first range that is less than a first angle (e.g., an angle range of 30 degrees or more and less than 150 degrees). In an example, the fourth user interface 714 may include a keyboard object capable of receiving a user input and an object indicating a screen output to the external electronic device 300. In an example, if the folding angle of the electronic device 101 changes into a second range equal to or greater than the first angle, a state 1503 of the electronic device 101 may switch from the fourth user interface 714 back to the second user interface 713, which are displayed on the display 240.

Figure 16:
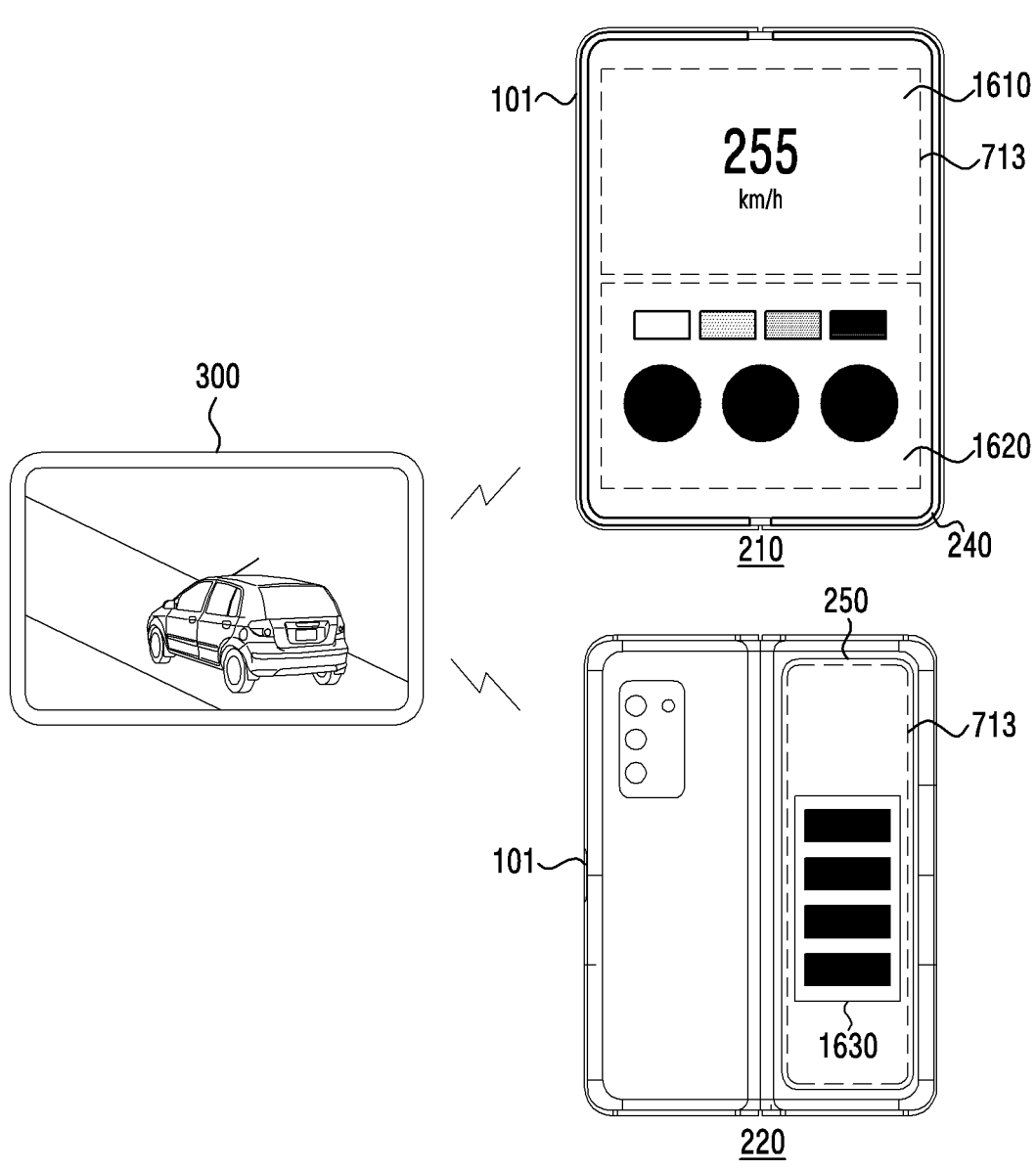
FIG. 16 illustrates an exemplary second user interface provided through a display of an electronic device according to an embodiment.

FIG. 16 illustrates an exemplary second user interface 713 provided through a screen area of a display 240 of an electronic device 101 according to an embodiment.

In an example, an application executing on an external electronic device 300 connected with the electronic device 101 may correspond to a game application. Accordingly, if target function information received by the external electronic device 300 indicates a game application, the electronic device 101 may determine a control means as a game control application. In an example, the electronic device 101 may execute a game control application corresponding to the control means.

Referring to FIG. 16, the electronic device 101 may display a second user interface 713 on the display 240 of the electronic device 101 according to the execution of the game control application corresponding to the control means. In an example, the electronic device 101 may display the second user interface 713 on the secondary display 250 of the electronic device 101.

In an embodiment, if the electronic device 101 executes a game control application corresponding to the control means, the processor 410 may display, on the display 240, a second user interface 713 for performing functions related to game control. For example, the second user interface 713 may include an object 1610 providing additional information related to game control and a button object 1620 for controlling the game.

In an example, the processor 410 may display, on the secondary display 250, an object 1630 indicating additional information including termination, configuration, and/or states of the game.

In an embodiment, the electronic device 101 may obtain control information for controlling the game control application executing on the external electronic device 300 by a fourth user input to the second user interface 713.

Figure 17A:
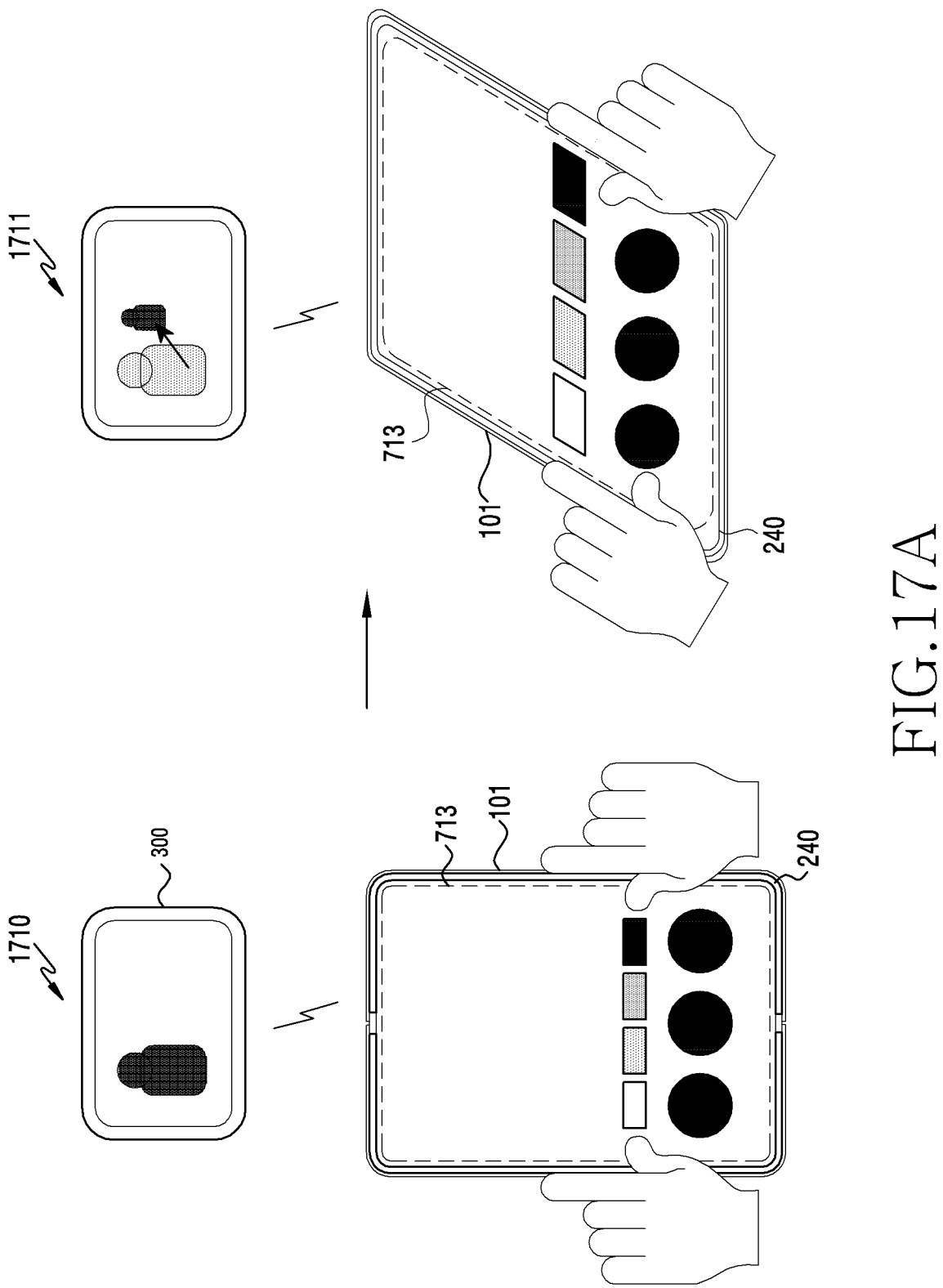
FIG. 17A illustrates an example of utilizing a second user interface provided through a display of an electronic device according to an embodiment.
Figure 17B:
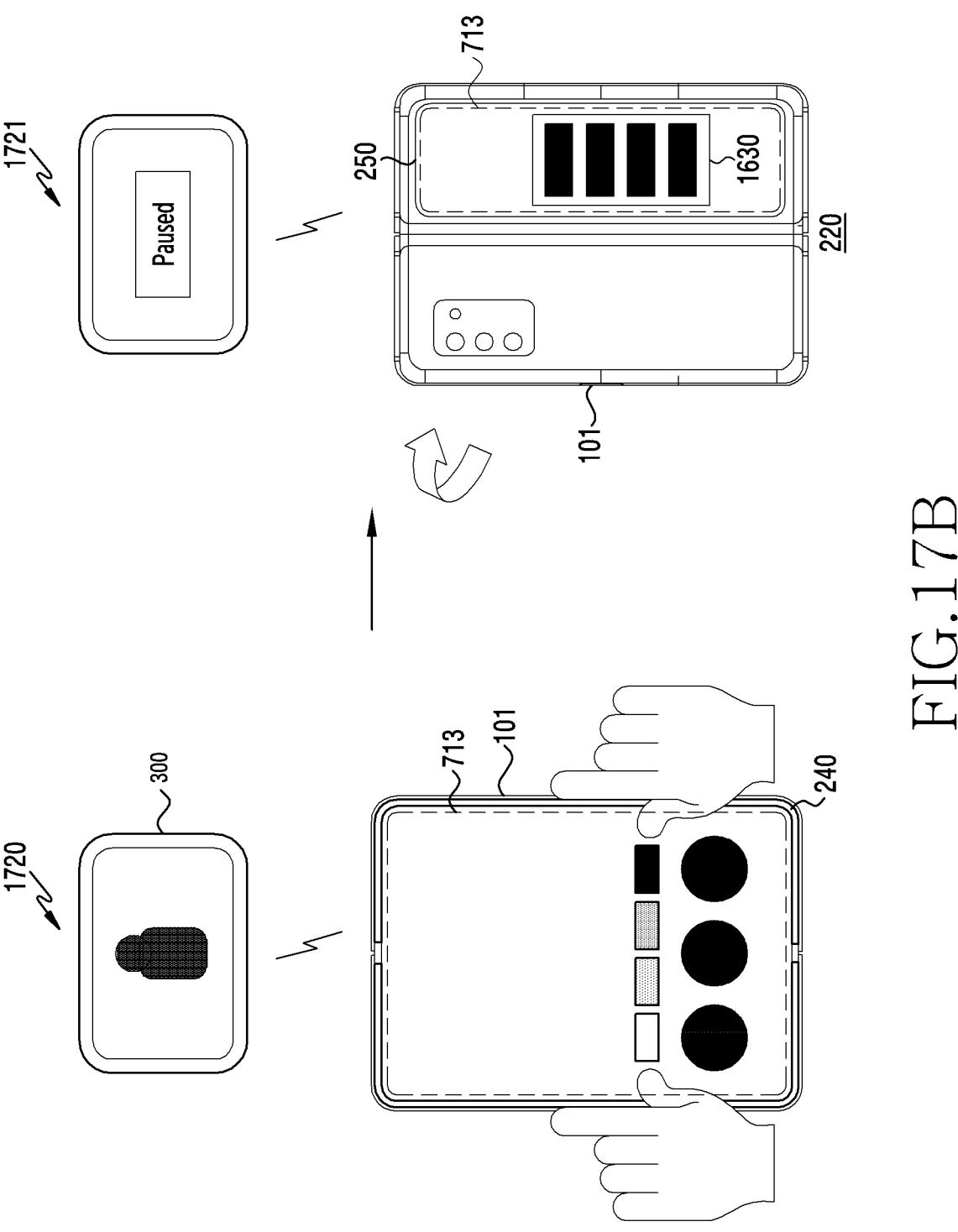
FIG. 17B illustrates an example of utilizing a second user interface provided through a display of an electronic device according to an embodiment.

FIGS. 17A to 17B illustrates examples of utilizing a second user interface 713 provided through a display 240 of an electronic device 101 according to an embodiment.

Referring to FIG. 17A, the electronic device 101 may detect movement of the electronic device 101. For example, the electronic device 101 may recognize an inclination of the electronic device 101. The electronic device 101 may control movement of an avatar in the game application executing on the external electronic device 300 by a fourth user input produced by a change in the inclination of the electronic device 101.

Referring to FIG. 17B, if the display 240 is flipped to face the floor, the electronic device 101 may perform control to stop the game executing on the external electronic device 300 by a fourth user input produced through detection of the rotation movement of the electronic device 101. In an example, the electronic device 101 may perform control to output a screen indicating the state of stopping the game through the external electronic device 300. In an example, the electronic device 101 may display, through the secondary display 250, an object 1630 indicating additional information including additional information indicating termination, configuration, and/or states of the game.

Figure 18:
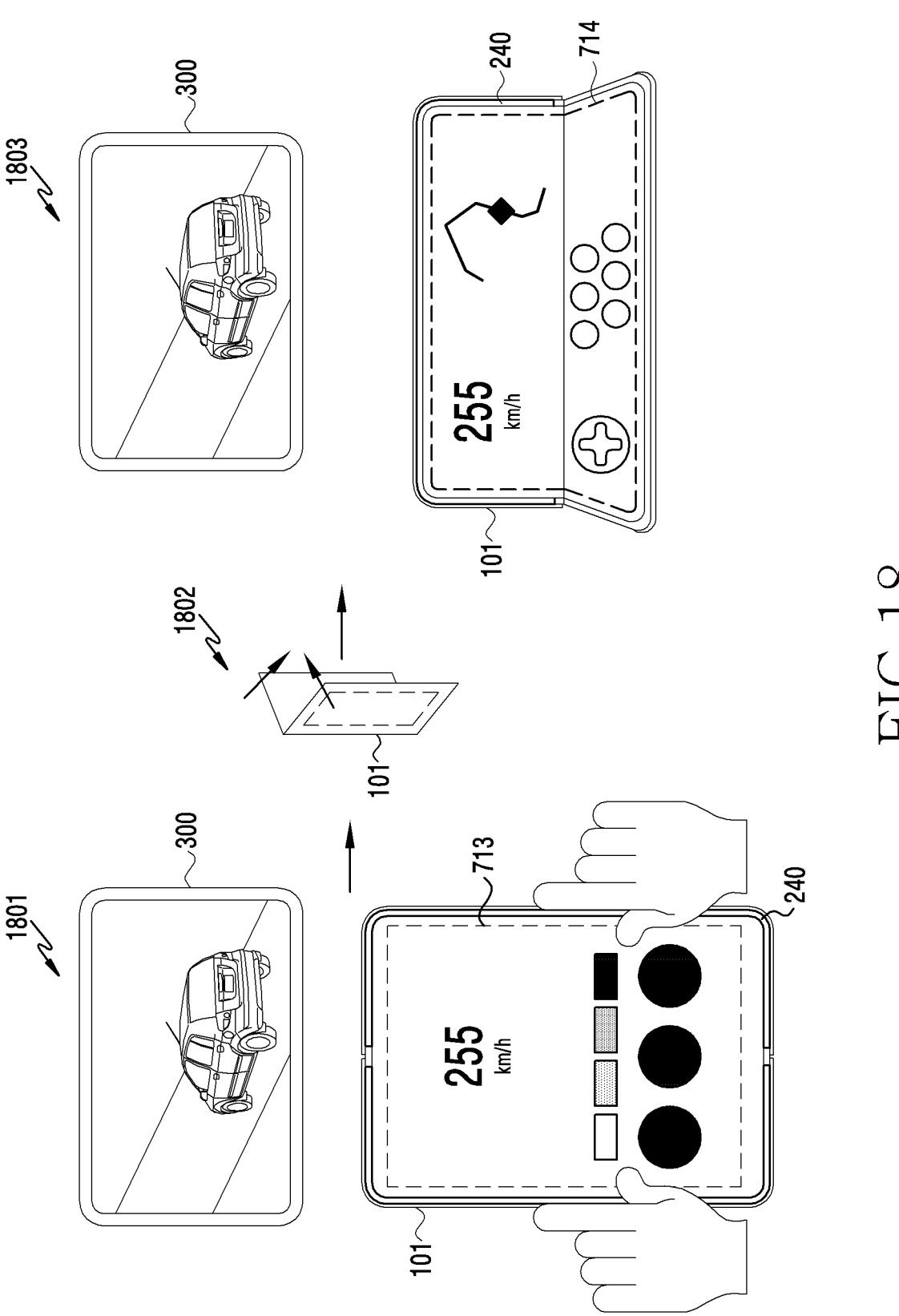
FIG. 18 illustrates a fourth user interface that switches based on a change in a folding angle of an electronic device according to an embodiment.

FIG. 18 illustrates a user interface that switches based on a change in a folding angle of an electronic device 101 according to an embodiment.

Referring to FIG. 18, if the folding angle of the electronic device 101 changes into a first range that is less than a first angle (e.g., an angle range of 30 degrees or more and less than 150 degrees), a state 1802 of the electronic device 101 may switch from a second user interface 713 to a fourth user interface 714, which are displayed on the display 240. For example, if an application executing on the external electronic device 300 is a virtual car racing game application, the fourth user interface 714 may include objects that are different from those in the second user interface 713. In an example, the fourth user interface 714 may include an object indicating the speed and route of a virtual car displayed on one area of the display 240 and an object capable of controlling the virtual car racing game displayed on another area.

Figure 19:
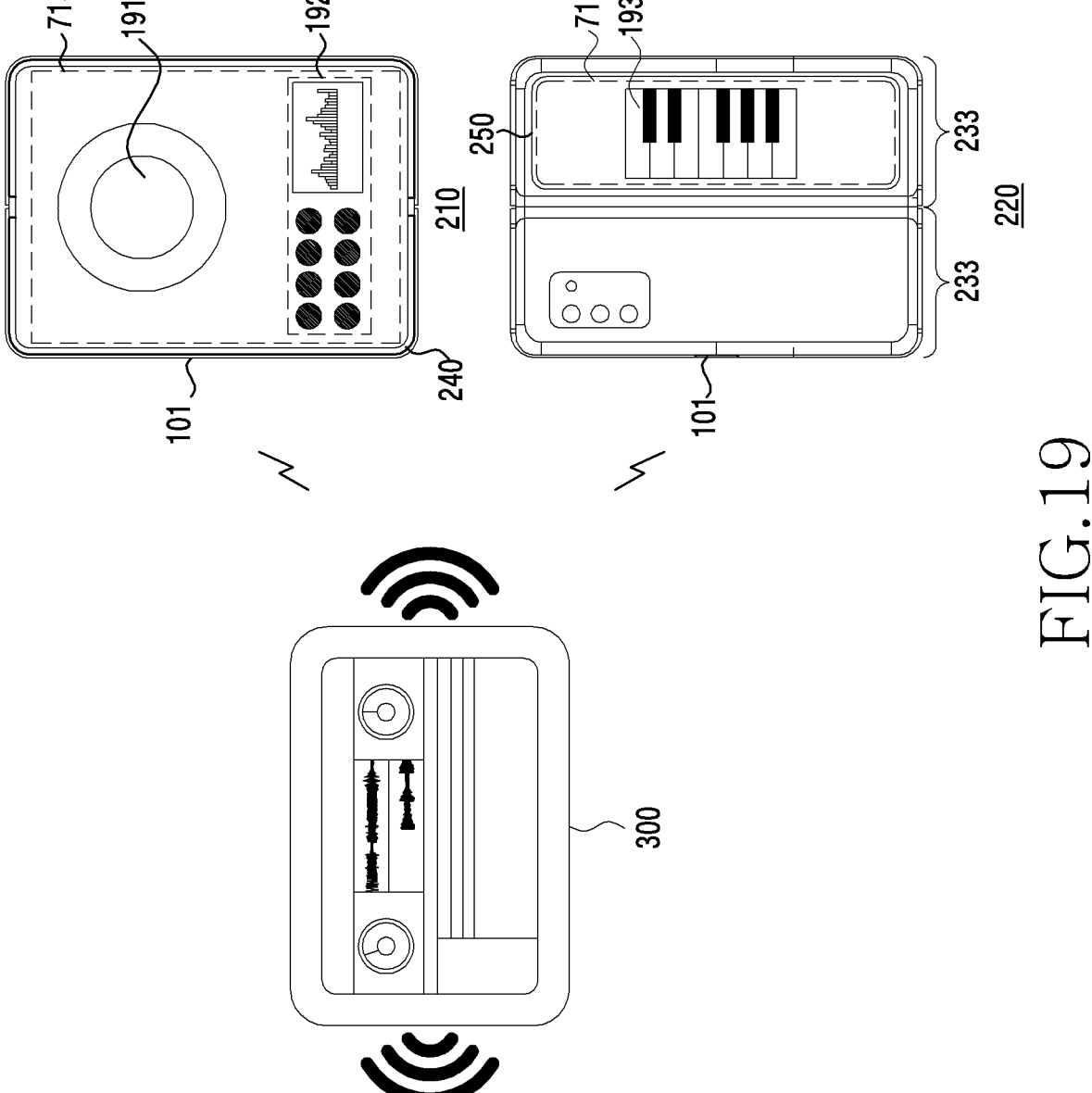
FIG. 19 illustrates an exemplary user interface provided through a display of an electronic device according to an embodiment.

FIG. 19 illustrates an exemplary user interface provided through a display 240 of an electronic device 101 according to an embodiment.

In an embodiment, if an application executing on an external electronic device 300 connected with the electronic device 101 corresponds to a DJing application, and if target function information received by the external electronic device 300 indicates a DJing control application according thereto, the electronic device 101 may determine a control means to be a control application providing a DJing control tool. In an example, the electronic device 101 may execute an application providing the DJing control tool corresponding to the control means.

In an embodiment, if the electronic device 101 executes the control application providing the DJing control tool corresponding to the control means, the processor 410 may display, on the display 240, a second user interface 713 for performing functions related to DJing control. For example, the second user interface 713 may include a turntable object 1910 for playing music and controlling the playing music and an object 1920 indicating the state screen of the playing music.

In an embodiment, the processor 410 may display an object 1930 indicating piano keyboards on the secondary display 250.

In an embodiment, the electronic device 101 may obtain control information for controlling the DJing application executing on the external electronic device 300 by a fourth user input to the second user interface 713.

Figure 20:
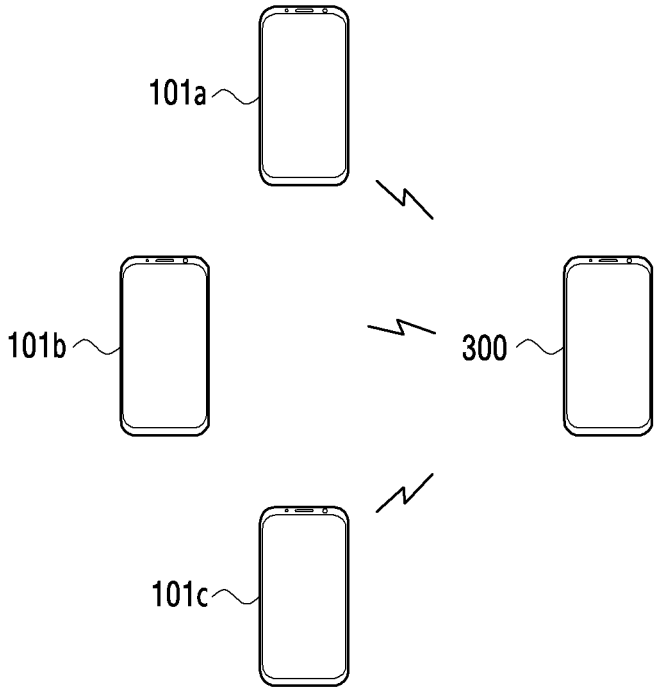
FIG. 20 illustrates a system including at least one electronic device for controlling an external electronic device according to an embodiment.

FIG. 20 illustrates a system including electronic device 101 for controlling an external electronic device 300 according to an embodiment.

Referring to FIG. 20, a system according to an embodiment may include electronic device 101 and an external electronic device 300. The external electronic device 300 may be connected to electronic device 101 through a network (e.g., the first network 198 and/or the second network 199 in FIG. 1).

In an embodiment, the external electronic device 101 may be controlled through a plurality of electronic devices 101. For example, an electronic device 101a may interwork with an electronic device 101b through the external electronic device 300, thereby controlling the external electronic device 300.

Figure 21A:
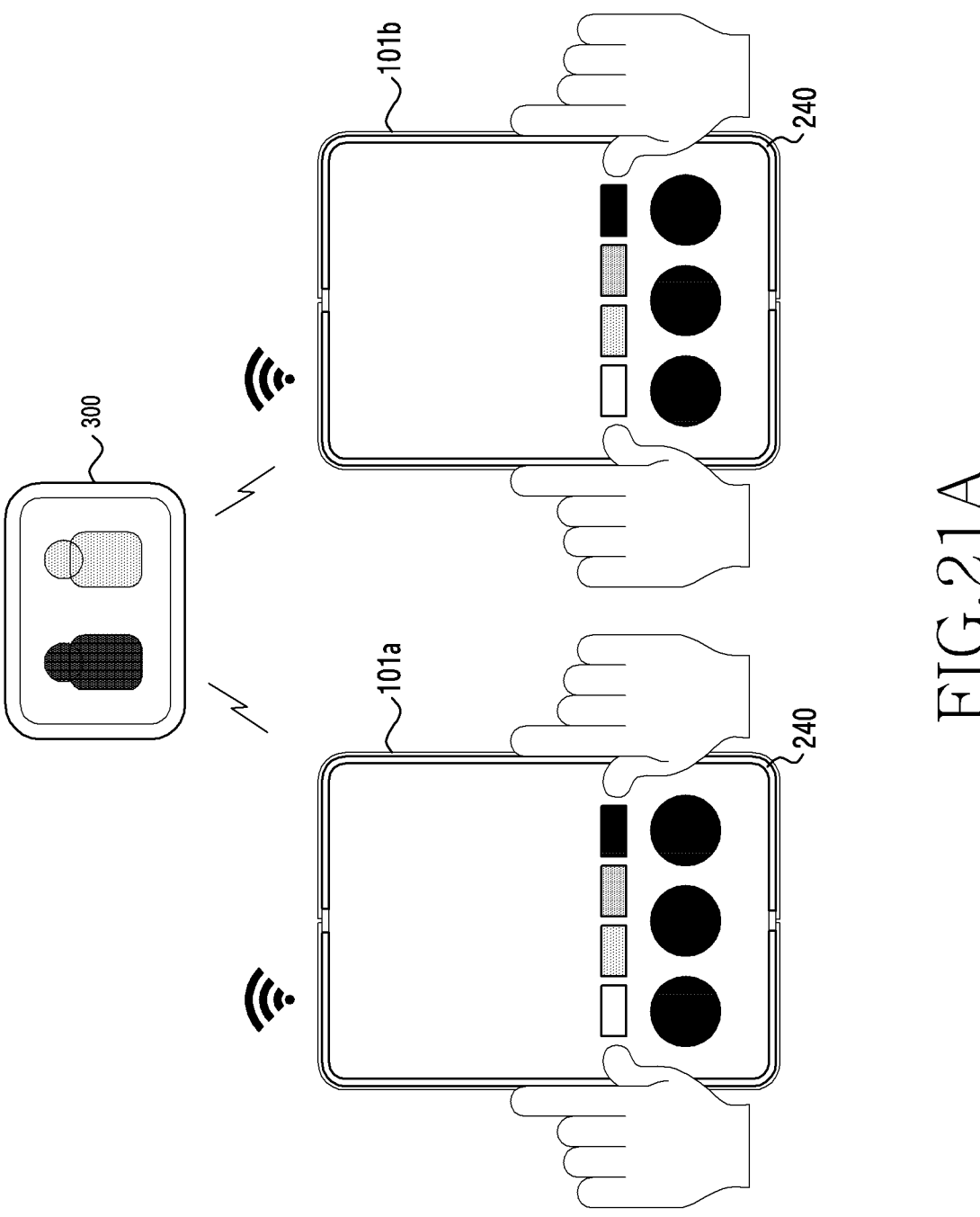
FIG. 21A illustrates an example provided by utilizing at least two or more electronic devices that control external electronic devices.
Figure 21B:
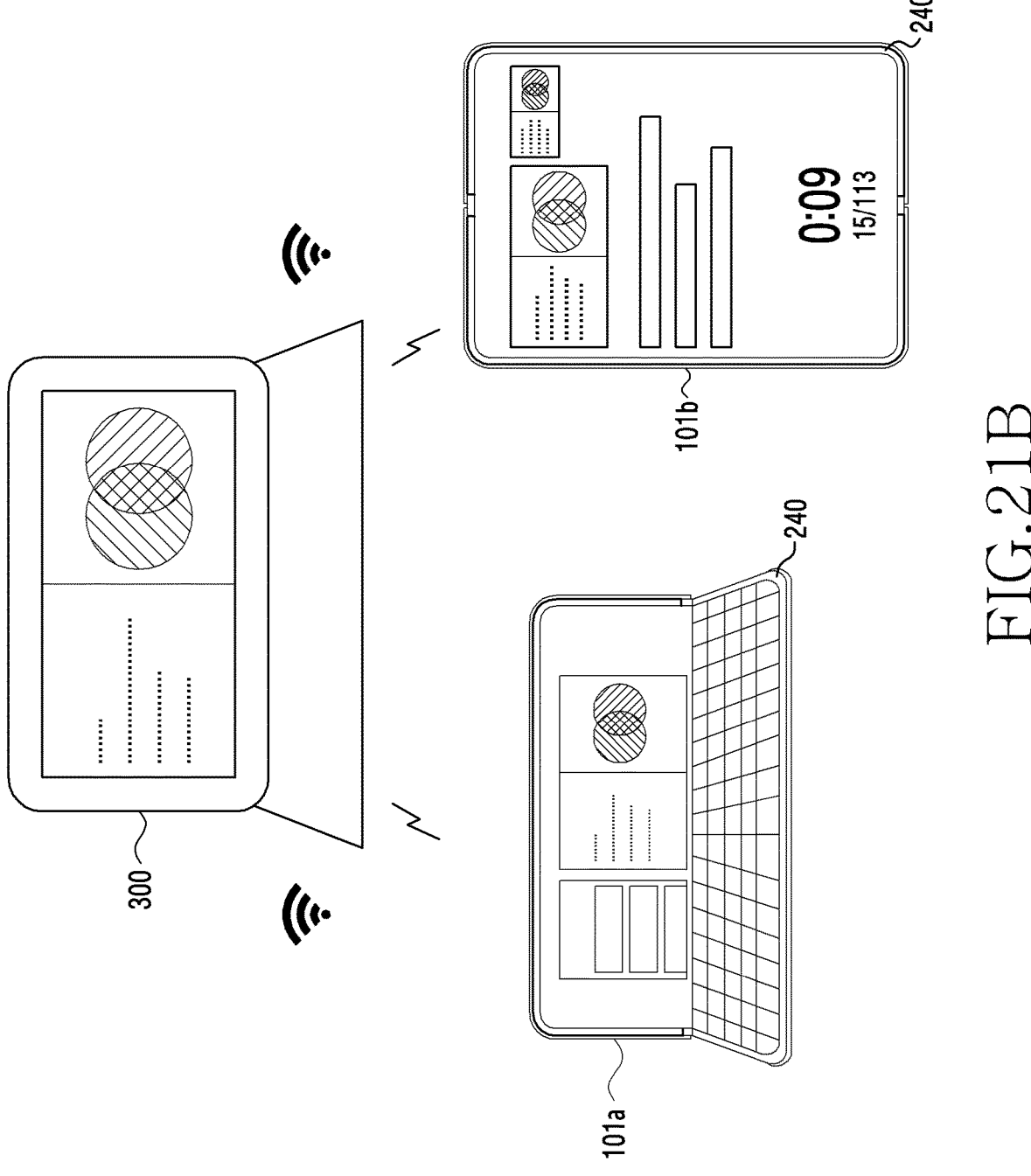
FIG. 21B illustrates an example provided by utilizing at least two or more electronic devices that controls external electronic devices.
Figure 21C:
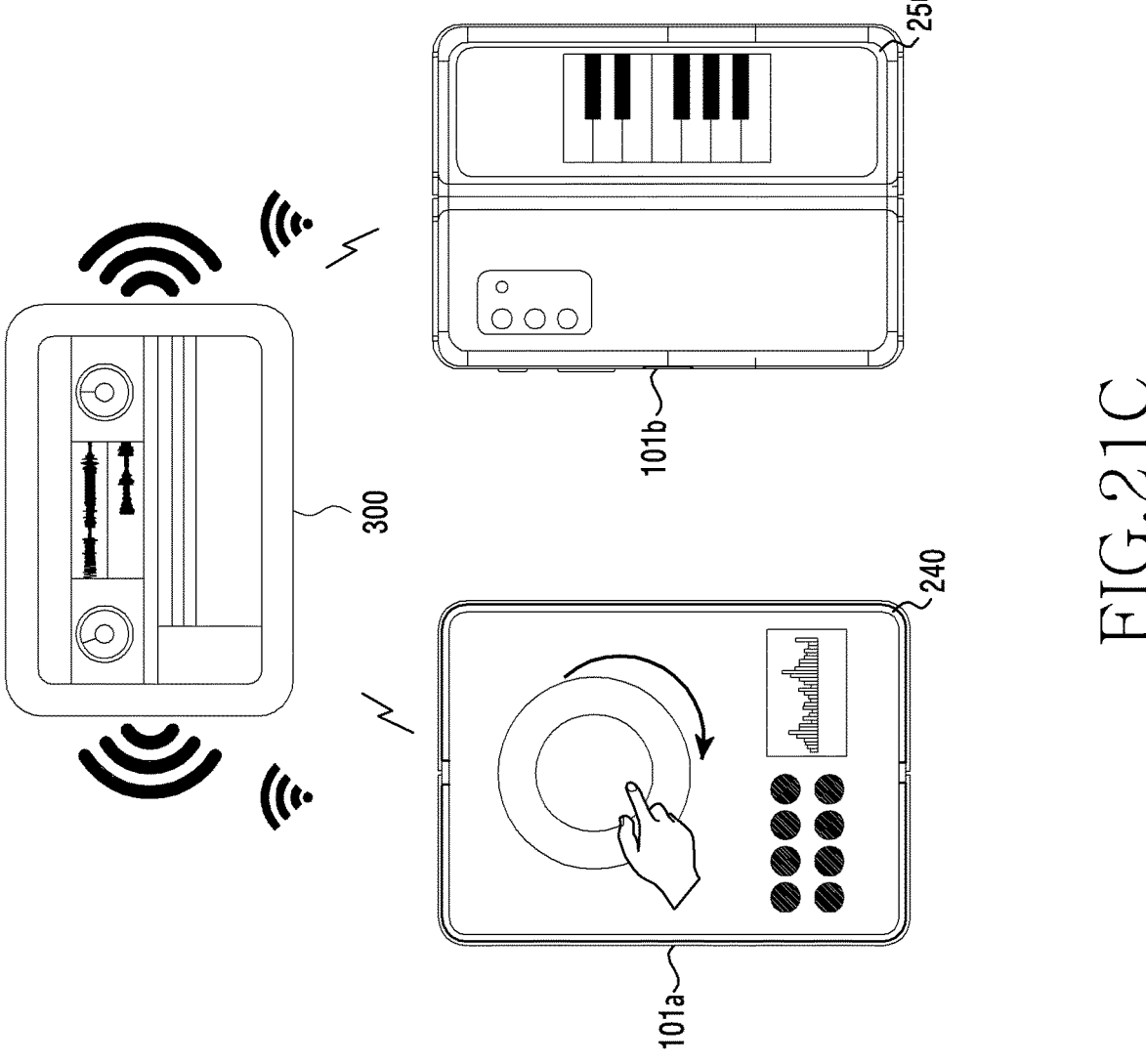
FIG. 21C illustrates an example provided by utilizing at least two or more electronic devices that control external electronic devices.

FIGS. 21A to 21C illustrates an example provided by utilizing at least two or more electronic devices 101 that control an external electronic device 300.

Referring to FIG. 21A, electronic device 101 may be simultaneously connected to an external electronic device 300. The electronic device 101 may jointly perform a control function required for an application executing on the external electronic device 300 by utilizing at least two or more electronic devices 101. In an example, if an application executing on the external electronic device 300 performs a function through a plurality of characters output to the screen, an electronic device 101*a* may control any one character, and an electronic device 101*b* may control another character, enabling mutual control.

Referring to FIG. 21B, if an application executing on the external electronic device 300 corresponds to a presentation application, the electronic device 101*a* and the electronic device 101*b* may execute a presentation control application corresponding to the control means. In an example, the electronic device 101*a* may output a user interface for editing the presentation screen to the display 240, and the electronic device 101*b* may output, to the display 240, a user interface for controlling a screen page of the presentation output to the external electronic device 300.

Referring to FIG. 21C, if an application executing on the external electronic device 300 corresponds to a DJing application, the electronic device 101*a* and the electronic device 101*b* may execute a control application providing a DJing control tool corresponding to the control means. In an example, the electronic device 101*a* may output a user interface for playing music and controlling the playing music to the display 240, and the electronic device 101*b* may output a user interface for playing music using virtual piano keyboards to the secondary display 250.

According to certain embodiments, an electronic device may include a housing, a display, at least one memory configured to store applications, a communication module, and at least one processor electrically connected to the display, the memory and the communication module, the at least one processor may be configured to receive connection information including device identification information and target function information from at least one external electronic device through the communication module, control, in response to receipt of the connection information, the display to display a first user interface for receiving a first user input indicating connection approval, determine a control means, based on the target function information, in response to the first user input, add the external electronic device to a connection candidate device list, control the display to display the connection candidate device list including an indicator indicating the external electronic device, and control the display to display a second user interface by executing the determined control means in response to a second user input for selecting the indicator from the connection candidate device list.

According to an embodiment, the device identification information may include a device name of the external electronic device, a model name of the external electronic device, and a network address of the external electronic device.

According to an embodiment, the device identification information may include operating system identification information of the external electronic device, and the target function information may include identification information of an application executing on the external electronic device, and the processor may search for a control application corresponding to the operating system of the electronic device, based on the operating system identification information of the external electronic device and the identification information of the application executing on the external electronic device, and determine the control means, based on a searched result of the control application corresponding to an operating system of the electronic device.

According to an embodiment, the processor may determine whether the control application is installed in the electronic device if the control means is the control application corresponding to the operating system of the electronic device, install the control application if the control application is not installed in the electronic device, execute the control application, and transmit, in response to a fourth user input received through a second user interface displayed by the execution of the control application, control information for controlling an application executing on the external electronic device to the external electronic device.

According to an embodiment, the processor may search for a web page address corresponding to identification information of the control application if the control application is unable to be installed in the electronic device and execute a web browser to access a web page corresponding to the searched web page address.

According to an embodiment, the connection candidate device list may include a third user interface configured to receive an input for selecting a layout for disposition of the second user interface according to the selected indicator, and the processor may control the display to display respective second user interfaces in a plurality of areas included in the layout in response to a third user input for selecting the external electronic device and the layout from the connection candidate device list.

According to an embodiment, the processor may control the display to display the connection candidate device list including the external electronic device and transmit a connection request to the external electronic device through the communication module in response to a second user input for selecting the external electronic device from the connection candidate device list.

According to an embodiment, the connection candidate device list may include information about of the external electronic device that is logging on to a service provided through the electronic device using the same account information as user account information used to log on to the service, the external electronic device that is logging on to the service using account information linked to the user account information, the external electronic device having a wireless communication link with the electronic device, the external electronic device connected to an access point to which the electronic device logged on, and the external electronic device connected to the electronic device through wired communication.

According to an embodiment, if the target function information indicates an image editing application, the control means may include a control application providing an image editing tool.

According to an embodiment, the second user interface may include a color selection area, a touch pad area, and a jog dial area.

According to an embodiment, if the target function information indicates a presentation application, the second user interface may include a slide list for presentation content displayed on the external electronic device, and the processor may control the communication module to transmit, to the external electronic device, control information for controlling presentation content displayed on the external electronic device in response to a fourth user input to the slide list.

According to an embodiment, if the target function information indicates a game application, the second user interface may include a game control area and an area providing information related to the game.

According to an embodiment, the housing may include a first housing and a second housing coupled to the first housing so as to be rotatable relative to the first housing, and the processor may identify a change in a folding angle formed by the first housing and the second housing and switch the second user interface to a fourth user interface in response to the change in the angle.

According to certain embodiments, an operation method of an electronic device may include receiving connection information including device identification information and target function information from external electronic device through a communication module, controlling, in response to the receipt of the connection information, a display to display a first user interface for receiving a first user input indicating connection approval, determining a control means, based on the target function information, in response to the first user input, and adding the external electronic device to a connection candidate device list, controlling the display to display the connection candidate device list including an indicator indicating the external electronic device, and controlling the display to display a second user interface by executing the determined control means in response to a second user input for selecting the indicator from the connection candidate device list.

According to an embodiment, the device identification information may include operating system identification information of the external electronic device, and the target function information may include identification information of an application executing on the external electronic device, and the method may further include searching for a control application corresponding to an operating system of the electronic device, based on the operating system identification information and the identification information of the application executing on the external electronic device, and determining the control means, based on a searched result of the control application corresponding to the operating system of the electronic device.

According to an embodiment, the method may further include determining whether the control application is installed in the electronic device if the control means is the control application corresponding to the operating system of the electronic device, installing the control application if the control application is not installed in the electronic device, and executing the control application and transmitting, in response to a user input received through the control application, control information for controlling an application executing on the external electronic device to the external electronic device.

According to an embodiment, the method may further include searching for a web page address corresponding to identification information of the control application if the control application is unable to be installed in the electronic device and executing a web browser to access a web page corresponding to the searched web page address.

According to an embodiment, the connection candidate device list may include a third user interface configured to receive an input for selecting a layout for disposition of the second user interface according to the indicator selected by the second user input, and the method may further include controlling the display to display respective second user interfaces in a plurality of areas included in the layout in response to a third user input for selecting the external electronic device and the layout from the connection candidate device list.

According to an embodiment, the method may further include controlling the display to display the connection candidate device list including the external electronic device and transmitting a connection request to the external electronic device through the communication module in response to the second user input for selecting the external electronic device from the connection candidate device list.

According to an embodiment, the method may further include identifying a change in an angle formed between a first housing and a second housing coupled to the first housing so as to be rotatable relative to the first housing, and switching the second user interface to a fourth user interface in response to the change in the angle.

What is claimed is:

1. An electronic device comprising:
a housing;
a display;
a memory configured to store applications;
a communication module; and
at least one processor electrically connected to the display, the memory, and the communication module,
wherein the at least one processor is configured to:
receive connection information including device identification information and target function information from at least one external electronic device via the communication module;
control, in response to reception of the connection information, the display to display a first user interface for receiving a first user input indicating connection approval;
search, in response to the first user input, for a control application corresponding to an operating system of the electronic device, based on an operating system identification information of the at least one external electronic device and identification information of an application executing on the at least one external electronic device;
determine whether the control application is installed in the electronic device;
execute the control application by installing the control application if the control application is not installed in the electronic device and the control application can be installed in the electronic device:
search for a web page address corresponding to identification information of the control application and execute a web browser to access a web page corresponding to the searched web page address when the control application is unable to be installed in the electronic device;
determine a control means, based on a result of executing the control application when the control application can be installed in the electronic device and a result of executing the web browser when the control application is unable to be installed in the electronic device;
add the at least one external electronic device to a connection candidate device list;
control the display to display the connection candidate device list indicating the at least one external electronic device; and
control the display to display a second user interface by executing the determined control means in response to a second user input selecting an indicator from the connection candidate device list,
wherein the device identification information includes operating system identification information of the at least one external electronic device, and
wherein the target function information includes identification information of an application executing on the at least one external electronic device.

2. The electronic device of claim 1, wherein the at least one processor is further configured to:
transmit to the at least one external electronic device, in response to a fourth user input received through a second user interface displayed by the execution of the control application, control information for controlling an application executing on the at least one external electronic device to the at least one external electronic device if the control application is not installed in the electronic device.

3. The electronic device of claim 1, wherein the connection candidate device list comprises a third user interface configured to receive an input for selecting a layout for disposition of the second user interface according to the selected indicator, and wherein the at least one processor is configured to control the display to display the second user interface in a plurality of areas included in a selected layout, wherein the third user interface is displayed in response to a third user input for selecting the at least one external electronic device and the layout from the connection candidate device list.

4. The electronic device of claim 1, wherein the at least one processor is further configured to:

control the display to display the connection candidate device list including the at least one external electronic device; and transmit a connection request to the at least one external electronic device through the communication module, in response to a second user input for selecting the at least one external electronic device displayed in the connection candidate device list.

5. The electronic device of claim 4, wherein the connection candidate device list includes information about at least one of:

the at least one external electronic device that is logging on to a service provided through the electronic device using the same account information as user account information used to log on to the service, the at least one external electronic device that is logging on to the service using account information linked to the user account information, the at least one external electronic device having a wireless communication link with the electronic device, the at least one external electronic device connected to an access point to which the electronic device logged on, and the at least one external electronic device connected to the electronic device through wired communication.

6. The electronic device of claim 1, wherein if the target function information indicates an image editing application, the control means is a control application providing an image editing tool.

7. The electronic device of claim 6, wherein the second user interface comprises a color selection area, a touch pad area, and a jog dial area.

8. The electronic device of claim 1, wherein if the target function information indicates a presentation application, the second user interface includes a slide list for presentation of content displayed on the at least one external electronic device, and wherein the at least one processor is configured to control the communication module to transmit, to the at least one external electronic device, control information for controlling presentation content displayed on the at least one external electronic device in response to a fourth user input to the slide list.

9. The electronic device of claim 1, wherein if the target function information indicates a game application, the second user interface comprises a game control area and an area providing information related to the game application.

10. The electronic device of claim 1, wherein the housing comprises a first housing and a second housing coupled to the first housing to be rotatable relative to the first housing, and wherein the at least one processor is further configured to:

identify a change in a folding angle formed between the first housing and the second housing; and switch the second user interface to a fourth user interface in response to the change in the folding angle.

11. A method of operating an electronic device, the method comprising:

receiving connection information including device identification information and target function information from at least one external electronic device via a communication module;

controlling, in response to reception of the connection information, a display to display a first user interface for receiving a first user input indicating connection approval;

searching, in response to the first user input, for a control application corresponding to an operating system of the electronic device, based on operating system identification information of the at least one external electronic device and identification information of an application executing on the at least one external electronic device;

determining whether the control application is installed in the electronic device;

executing the control application by installing the control application if the control application is not installed in the electronic device and the control application can be installed in the electronic device;

searching for a web page address corresponding to identification information of the control application and execute a web browser to access a web page corresponding to the searched web page address when the control application is unable to be installed in the electronic device;

determining a control means, based on a result of executing the control application when the control application can be installed in the electronic device and a result of executing the web browser when the control application is unable to be installed in the electronic device;

adding the at least one external electronic device to a connection candidate device list;

controlling the display to display the connection candidate device list comprising an indicator indicating the at least one external electronic device; and controlling the display to display a second user interface by executing the determined control means in response to a second user input for selecting the indicator from the connection candidate device list, wherein the device identification information includes operating system identification information of the at least one external electronic device, and wherein the target function information includes identification information of the application executing on the at least one external electronic device.

12. The method of claim 11, further comprising:

transmitting to the at least one external electronic device, in response to a user input received through the control application, control information for controlling an application executing on the at least one external electronic device to the at least one external electronic device if the control application is not installed in the electronic device.

13. The method of claim 11, wherein the connection candidate device list comprises a third user interface receiving an input for selecting a layout for disposition of the second user interface according to the selected indicator, and wherein at least one processor is configured to control the display to display the second user interface in a plurality of areas included in a selected layout, wherein the third user interface is displayed in response to a third user input for selecting the at least one external electronic device and the layout from the connection candidate device list.

14. The method of claim 11, the method further comprising:

controlling the display to display the connection candidate device list including the at least one external electronic device; and transmitting a connection request to the at least one electronic device through the communication module, in response to a second user input for selecting the at least one external electronic device displayed the connection candidate device list.

15. The method of claim 14, wherein the connection candidate device list includes information about of:

the at least one external electronic device that is logging on to a service provided through the electronic device using the same account information as user account information used to log on to the service, the at least one external electronic device that is logging on to the service using account information linked to the user account information, the at least one external electronic device having a wireless communication link with the electronic device, the at least one external electronic device connected to an access point to which the electronic device logged on, and the at least one external electronic device connected to the electronic device through wired communication.

16. The method of claim 11, wherein if the target function information indicates an image editing application, the control means is a control application providing an image editing tool, and wherein the second user interface comprises a color selection area, a touch pad area, and a jog dial area.

17. The method of claim 11, wherein if the target function information indicates a presentation application, the second user interface includes a slide list for presentation of content displayed on the at least one external electronic device, wherein at least one processor is configured to control the communication module to transmit, to the at least one external electronic device, control information for controlling presentation content displayed on the at least one external electronic device in response to a fourth user input to the slide list, wherein if the target function information indicates a game application, the second user interface comprises a game control area and an area providing information related to the game application.

* * * * *